(12) United States Patent
Raghavan et al.

(10) Patent No.: US 7,388,904 B2
(45) Date of Patent: Jun. 17, 2008

(54) NEAR-END, FAR-END AND ECHO CANCELLERS IN A MULTI-CHANNEL TRANSCEIVER SYSTEM

(75) Inventors: Sreen A. Raghavan, La Jolla, CA (US); Thulasinath G. Manickam, San Diego, CA (US); Peter J. Sallaway, San Diego, CA (US); Gerard E. Taylor, Laguna Nigel, CA (US)

(73) Assignee: Vativ Technologies, Inc., San Diego, CA (US)

( * ) Notice: Subject to any disclaimer, the term of this patent is extended or adjusted under 35 U.S.C. 154(b) by 708 days.

(21) Appl. No.: 10/454,382

(22) Filed: Jun. 3, 2003

(65) Prior Publication Data

US 2004/0247022 A1 Dec. 9, 2004

(51) Int. Cl.
*H04B 1/38* (2006.01)
(52) U.S. Cl. .................................................. 375/219
(58) Field of Classification Search ................ 375/219, 375/316, 318, 324, 148; 1/347, 265; 341/59; 332/103
See application file for complete search history.

(56) References Cited

U.S. PATENT DOCUMENTS

| | | | |
|---|---|---|---|
| 4,025,719 A * | 5/1977 | Nussbaumer | ............... 375/235 |
| 4,455,649 A | 6/1984 | Esteban et al. | |
| 4,599,732 A | 7/1986 | LeFever | |
| 4,679,225 A | 7/1987 | Higashiyama | |
| 4,710,922 A | 12/1987 | Scott | |
| 4,995,031 A | 2/1991 | Aly et al. | |
| 5,079,770 A | 1/1992 | Scott | |
| 5,285,474 A | 2/1994 | Chow et al. | |
| 5,293,378 A | 3/1994 | Shimizu | |

(Continued)

FOREIGN PATENT DOCUMENTS

CN 2161025 Y 4/1994

(Continued)

OTHER PUBLICATIONS

International Search Report for corresponding PCT Application No. PCT/US02/22339, issued Mar. 21, 2003 (4 pages).

(Continued)

*Primary Examiner*—Khai Tran
(74) *Attorney, Agent, or Firm*—Finnegan, Henderson, Farabow, Garrett & Dunner, L.L.P.

(57) ABSTRACT

A transceiver according to the present invention receives data from a plurality of frequency separated transmission channels from a complementary transmitter and includes an interference filter for correcting for interference from transmitters other than the complementary transmitter. The interference filter, for example, can correct for near-end cross-talk and echo interference filtering and/or far-end crosstalk interference filtering is presented. A transceiver can include a transmitter portion and a receiver portion with one or more receivers coupled to receives signals in the plurality of frequency separated transmission channels. A baseband transmitter can be combined with one or more transmitters that transmit data into one of the frequency separated transmission bands. Any combination of modulation systems can be utilized (e.g. PAM for the baseband and QAM for the frequency separated bands). In some embodiments, one baseband PAM transmitter is combined with one or more frequency separated QAM transmitters.

65 Claims, 12 Drawing Sheets

U.S. PATENT DOCUMENTS

| | | | |
|---|---|---|---|
| 5,535,228 | A | 7/1996 | Dong et al. |
| 5,604,768 | A | 2/1997 | Fulton |
| 5,715,280 | A | 2/1998 | Sandberg et al. |
| 5,781,617 | A | 7/1998 | McHale et al. |
| 5,796,783 | A | 8/1998 | Crawford |
| 5,808,671 | A * | 9/1998 | Maycock et al. ............ 348/180 |
| 5,822,368 | A | 10/1998 | Wang |
| 5,838,268 | A | 11/1998 | Frenkel |
| 5,838,732 | A * | 11/1998 | Carney ........................ 375/297 |
| 5,838,740 | A | 11/1998 | Kallman et al. |
| 5,844,950 | A * | 12/1998 | Aono et al. ................. 375/346 |
| 5,852,629 | A | 12/1998 | Iwamatsu |
| 5,930,231 | A | 7/1999 | Miller et al. |
| 5,991,311 | A * | 11/1999 | Long et al. .................. 370/524 |
| 5,999,575 | A | 12/1999 | Morinaga et al. |
| 6,005,893 | A | 12/1999 | Hyll |
| 6,044,112 | A | 3/2000 | Koslov |
| 6,121,828 | A | 9/2000 | Sasaki |
| 6,128,114 | A | 10/2000 | Wingo |
| 6,160,820 | A | 12/2000 | Isaksson et al. |
| 6,163,563 | A | 12/2000 | Baker et al. |
| 6,246,664 | B1 | 6/2001 | Boehm |
| 6,252,900 | B1 | 6/2001 | Liu et al. |
| 6,259,745 | B1 | 7/2001 | Chan |
| 6,269,129 | B1 * | 7/2001 | Rhee et al. .................. 375/341 |
| 6,275,544 | B1 * | 8/2001 | Aiello et al. ................ 375/326 |
| 6,292,559 | B1 | 9/2001 | Gaikwad et al. |
| 6,351,293 | B1 | 2/2002 | Perlow |
| 6,351,677 | B1 | 2/2002 | Leyonhjelm et al. |
| 6,407,843 | B1 | 6/2002 | Rowan et al. |
| 6,418,161 | B1 | 7/2002 | Shively et al. |
| 6,438,174 | B1 | 8/2002 | Isaksson et al. |
| 6,441,683 | B1 | 8/2002 | Hwang et al. |
| 6,462,679 | B1 | 10/2002 | Van Nguyen |
| 6,477,207 | B1 | 11/2002 | Lindholm |
| 6,496,540 | B1 | 12/2002 | Widmer |
| 6,522,702 | B1 | 2/2003 | Maruyama |
| 6,529,303 | B1 | 3/2003 | Rowan et al. |
| 6,647,071 | B2 | 11/2003 | Sommer et al. |
| 6,678,319 | B1 * | 1/2004 | Jamali ........................ 375/234 |
| 6,714,529 | B1 * | 3/2004 | Tanabe et al. ............... 370/343 |
| 6,724,331 | B1 | 4/2004 | El-Ghoroury et al. |
| 6,731,704 | B1 | 5/2004 | Kiyanagi |
| 6,804,497 | B2 | 10/2004 | Kerth et al. |
| 6,807,234 | B2 | 10/2004 | Hansen |
| 6,831,954 | B1 | 12/2004 | Mandyam |
| 6,970,448 | B1 * | 11/2005 | Sparrell et al. .............. 370/347 |
| 6,975,685 | B1 | 12/2005 | Merriam, Jr. |
| 7,236,757 | B2 | 6/2007 | Raghavan et al. |
| 7,295,623 | B2 | 11/2007 | Raghavan |
| 2001/0031014 | A1 | 10/2001 | Subramanian et al. |
| 2002/0039052 | A1 | 4/2002 | Straub et al. |
| 2002/0086651 | A1 | 7/2002 | Prentice et al. |
| 2002/0093994 | A1 | 7/2002 | Hendrickson et al. |
| 2002/0110206 | A1 * | 8/2002 | Becker et al. ............... 375/346 |
| 2002/0159551 | A1 | 10/2002 | Ekvetchavit et al. |
| 2002/0163974 | A1 | 11/2002 | Friedman |
| 2003/0017809 | A1 | 1/2003 | Garlepp et al. |
| 2003/0054782 | A1 | 3/2003 | Snider |
| 2003/0112798 | A1 | 6/2003 | Ziegler et al. |
| 2004/0091028 | A1 | 5/2004 | Aronson et al. |
| 2004/0106380 | A1 | 6/2004 | Vassiliou et al. |
| 2004/0121753 | A1 | 6/2004 | Sugar et al. |
| 2004/0130483 | A1 | 7/2004 | Brilka et al. |
| 2004/0137941 | A1 | 7/2004 | Tanaka et al. |
| 2004/0162023 | A1 | 8/2004 | Cho |
| 2004/0190660 | A1 * | 9/2004 | Morris et al. ............... 375/350 |

FOREIGN PATENT DOCUMENTS

| | | | |
|---|---|---|---|
| EP | 0554056 | B1 | 5/1998 |
| EP | 0987830 | A | 3/2000 |
| WO | WO 97/30521 | | 8/1997 |
| WO | WO 99/45683 | | 9/1999 |
| WO | WO 00/51303 | A | 8/2000 |
| WO | WO 03/007564 | A | 1/2003 |
| WO | WO 2004/109948 | A2 | 12/2004 |

OTHER PUBLICATIONS

Written Opinion for related PCT Application No. PCT/US2004/014538, issued Dec. 7, 2004 (6 pages).
Office Action mailed Mar. 10, 2005 in U.S. Appl. No. 09/904,432 (Our ref. 9146-01-00).
Response to Office Action dated Aug. 10, 2005, in U.S. Appl. No. 09/904,432 (Our ref. 9146-01-00).
Office Action mailed Dec. 17, 2004 in U.S. Appl. No. 09/965,242 (Our ref. 9146-01-01).
Response to Office Action dated Mar. 17, 2005 in U.S. Appl. No. 09/965,242 (Our ref. 9146-01-01).
Office Action mailed Jun. 28, 2005 in U.S. Appl. No. 09/965,242 (Our ref. 9146-01-01).
Office Action mailed Aug. 9, 2004 in U.S. Appl. No. 10/071,771 (Our ref. 9146-01-02).
Response to Office Action dated Jan. 10, 2005 in U.S. Appl. No. 10/071,771 (Our ref. 9146-01-02).
Office Action mailed Jun. 28, 2005 in U.S. Appl. No. 10/071,771 (Our ref. 9146-01-02).
Response to Office Action dated Sep. 28, 2005 in U.S. Appl. No. 10/071,771 (Our ref. 9146-01-02).
Office Action mailed Oct. 26, 2004 in U.S. Appl. No. 10/167,158 (Our ref. 9146-01-03).
Clark, Jr., G.C. and Cain, J.B., Error Correction for Digital Communications (Plenum Press, New York 1981) pp. 253-264.
International Search Report dated Jul. 12, 2004, from corresponding PCT Application No. PCT/US04/014538.
Lee, Edward A. and Messerschmitt, David G., Digital Communications (Kluwer Academic Publishers, 1988) pp. 371-402.
Sklar, Bernard, Digital Communications, Fundamentals and Applications (Prentice-Hall, Inc., 1988).
Ungerboeck, G., "Channel Coding with Multilevel/Phase Signals," IEEE Transactions on Information Theory, vol. It-28, Jan. 1982, pp. 56-67.
Ungerboeck, G., "Trellis Coding Modulation with Redundant Signal Sets, Part I. Introduction." IEEE Communications Magazine, vol. 25, No. 2, Feb. 1987, pp. 5-11.
Second Examination Report for EP Appl. No. 02 748 158.9, dated Mar. 14, 2006 (Our ref. 9146.01-155), 10 pages.
EPO Examination Report for EP Appl. No. 02 748 158.9, dated Dec. 8, 2004 (5 pages).
EPO Response to Examination Report for EP Appl. No. 02 748 158.9, dated Jul. 5, 2005 (23 pages).
Taiwanese Office Action granting acceptance for Appl. No. 91115102, dated Jul. 13, 2005 (4 pages).
Taiwanese Response to Official Letter for Appl. No. 91115102, dated May 26, 2005 (6 pages).
International Preliminary Report on Patentability for WO Application No. PCT/US2004/014538, mailed Dec. 22, 2005 (8 pages).
Article 34 Amendment for WO Appl. No. PCT/US02/22339, filed Dec. 18, 2003 (31 pages).
Written Opinion for WO Application No. PCT/US02/22339, dated Feb. 13, 2004 (11 pages).
International Preliminary Examination Report for WO Application No. PCT/US02/22339, dated Sep. 17, 2004 (24 pages).
Final Office Action mailed Nov. 15, 2005 in U.S. Appl. No. 09/904,432 (Our ref. 9146-01-00).
Response to Final Office Action filed Feb 15, 2006 in U.S. Appl. No. 09/904,432 (Our ref. 9146-01-00).
Response to Office Action dated Oct. 28, 2005 in U.S. Appl. No. 09/965,242 (Our ref. 9146-01-01).
Final Office Action mailed Jan. 30, 2006 in U.S. Appl. No. 09/965,242 (Our ref. 9146-01-01).
Office Action dated Dec. 28, 2005 in U.S. Appl. No. 10/071,771 (Our ref. 9146-01-02).

Office Action dated May 17, 2006, in U.S. Appl. No. 09/904,432.
Response to Office Action dated Sep. 12, 2006, in U.S. Appl. No. 09/904,432.
Office Action issued by the Chinese IPO on Mar. 17, 2006, with English translation, 18 pages.
Response to Second Examination Report for EP Application No. 02 748 158.9 dated Sep. 12, 2006.
Response to Final Office Action dated May 1, 2006, in U.S. Appl. No. 09/965,242.
Office Action mailed Jul. 26, 2006, in U.S. Appl. No. 09/965,242.
Response to Office Action dated Oct. 18, 2006, in U.S. Appl. No. 09/965,242.
Response to Office Action dated Mar. 28, 2006, in U.S. Appl. No. 10/071,771.
Final Office Action dated Jun. 13, 2006, in U.S. Appl. No. 10/071,771.
Response to Office Action dated Aug. 1, 2006, in U.S. Appl. No. 10/071,771.
Notice of Allowance dated Dec. 19, 2006, in U.S. Appl. No. 09/904,432.
Amendment dated Feb. 21, 2007, in U.S. Appl. No. 09/904,432.
Second Office Action issued by the Chinese IPO in Chinese Application No. 02817774.6 on Dec. 15, 2006.
Final Office Action dated Jan. 4, 2007, in U.S. Appl. No. 09/965,242.
Amendment After Final dated Feb. 21, 2007, in U.S. Appl. No. 09/965,242.
Notice of Allowance dated Jan. 4, 2007, in U.S. Appl. No. 10/071,771.
Response to Office Action dated Dec. 20, 2006, in U.S. Appl. No. 10/310,255.
Response to Office Action dated Oct. 8, 2006, to the Chinese IPO.
Office Action dated Nov. 22, 2006, in U.S. Appl. No. 10/310,355.
Notice of Allowance dated Mar. 22, 2007, in U.S. Appl. No. 10/071,771.
Advisory Action dated Mar. 21, 2007, in U.S. Appl. No. 09/965,242.
Notice of Allowance mailed Jun. 28, 2007, in U.S. Appl. No. 09/904,432.
Supplemental Notice of Allowance mailed Jul. 25, 2007, in U.S. Appl. No. 09/904,432.
Reply to Advisory Action filed May 4, 2007, in U.S. Appl. No. 09/965,242.
Office Action mailed Aug. 8, 2007, in U.S. Appl. No. 09/965,242.
Restriction Requirement mailed Mar. 21, 2007, in U.S. Appl. No. 10/310,255.
Response to Restriction Requirement filed Apr. 23, 2007, in U.S. Appl. No. 10/310,255.
Office Action mailed Aug. 9, 2007, in U.S. Appl. No. 10/310,255.
Voluntary Amendment filed Nov. 2, 2006 (in Chinese), in Chinese Appl. No. 200480015236.7.
Supplemental Notice of Allowance mailed Jan. 19, 2007, in U.S. Appl. No. 09/904,432.
Response to Office Action dated Nov. 8, 2007, in U.S. Appl. No. 09/965,242.
Response to Office Action dated Nov. 9, 2007, in U.S. Appl. No. 10/310,255.
Final Office Action dated Feb. 5, 2008, in U.S. Appl. No. 09/965,242.
Notice of Allowance dated Jan. 22, 2008, in U.S. Appl. No. 10/310,255.

* cited by examiner

NEAR-END, FAR-END AND ECHO CANCELLERS IN A MULTI-CHANNEL TRANSCEIVER SYSTEM

BACKGROUND

1. Field of the Invention

The present invention is related to high-speed communications of data in a communication system and, in particular, to high data rate transmission of data between components in a communication system.

2. Discussion of Related Art

There is currently a great deal of interest in high speed transceiver systems, both for communications in an intranet environment and for communications between components in various systems. As an example of a high data rate system, high-speed Ethernet local area networks (LANs), 100 BASE-TX Ethernet and 1000 Base TX Ethernet (1 Gigabit/s) using category-5, 5E or 6 copper wire, are being developed. These high speed systems require new techniques in high-speed data processing. High-speed data transmission techniques are also useful in wide-area networks and digital subscriber loop applications. High data rate transceiver systems are also utilized in many back-plane environments, including optical switching devices, router systems, switches, and storage area networking switches. Other environments that utilize high speed communication between components include inter-cabinet communications and chip-to-chip communications.

Typically, data is transferred in a communication system by transmitting signals having voltages from sets of voltages referred to as symbol sets. Each symbol (i.e. voltage level) in the symbol set represents one or more digital bits of data. Existing techniques utilized in such environments typically use non-return to zero (NRZ) modulation to send and receive information over high-bandwidth transmission media. Other common symbol sets include MLT3, PAM or QAM systems. Typically, the transceiver for sending high-speed data over such networks is called a serializer/deserializer, or SERDES, device.

FIG. 1A shows a block diagram of a typical transceiver environment 100. Components 101-1 through 101-Q are coupled to transmit and receive data through input/output (I/O) ports 102-1 through 102-Q, respectively, which are coupled through transmission medium 110. Conventionally, components 101-1 through 101-Q are SERDES devices. Transceiver environment 100 can represent either a backplane environment (where components 101-1 through 101-Q are physically relatively close to one another) or a networking environment (where components 101-1 through 101-Q are more separated).

FIG. 1B shows a block diagram of a conventional transmitter portion of one of SERDES devices 101-1 through 101-Q on I/O ports 102-1 through 102-Q, respectively. Parallel data is received in a bit encoder 105. Bit encoder 105 encodes the parallel data, for example by adding redundancy in the input data, to ensure a minimum rate of data transitions in the output data stream. Typical encoding schemes include rate 8/10 (8 bit input to 10 bit output) encoding. The parallel data is serialized in parallel to serial converter 106. Output driver 107 then receives the serialized data from parallel to serial converter 106 and outputs, usually, a differential voltage signal for transmission over transmission medium 110. In addition, there is typically a phase locked loop (PLL) 114 that provides the necessary clock signals for encoder 105 and parallel-to-serial converter 106. The input signal to PLL 114 is a reference clock signal from a system PLL 103.

FIG. 1C shows an example of a conventional receiver 108 of one of SERDES devices 101-1 through 101-Q on I/O ports 102-1 through 102-Q, respectively, of FIG. 1A. Input driver 109 receives a differential voltage signal from transmission medium 110 and outputs the analog data signal to clock and data recovery circuit 115. Data recovery 115 can, in some systems, perform equalization, recover the timing, and output a serial bit stream of data to serial-to-parallel converter 111. The serial data is input to bit decoder 112, which converts the parallel data to parallel decoded data. Clock and data recovery circuit 115 also outputs the necessary clock signals to serial-to-parallel converter 111 and bit decoder 112.

The actual demands for the various data transmission environments may vary widely (e.g., LAN environments have different transmission requirements from back-plane environments). A conventional SERDES system 100 for a back-plane environment, for example, can enable serial data communication at data rates as high as 2.5 Gbps to 3.125 Gbps over a pair of FR4 copper traces in a copper back-plane communication system. Current systems utilizing category 5, 5E or 6 copper wire can enable serial data communications rates as high as 1 Gbit/sec using Gigabit Ethernet. One of the biggest problems with existing SERDES systems 100 is that they are very bandwidth inefficient, i.e., they require 3.125 GHz of bandwidth to transmit and receive 2.5 Gbps of data over a single pair of copper wires. Therefore, it is very difficult to increase the data rates across bus 110. Additionally, SERDES system 100 requires the implementation of a high clock rate (3.125 GHz for 2.5 Gbps data rates) phase locked loop (PLL) 114 implemented to transmit data and recover high clock rates in data recovery 115. The timing window within which receiver 108 needs to determine whether the received symbol in data recovery 115 is a 1 or a 0 is about 320 ps for the higher data rate systems. This timing window creates extremely stringent requirements on the design of data recovery 115 and PLL 114, as they must have very low peak-to-peak jitter.

Conventional networking environments operate at slower baud rates, but suffer from similar difficulties. As an example, a 1 Gigabit transfer can be accomplished through transmitting PAM-5 data at 125 MHz through four (4) twisted copper pair. It would be desirable to allow higher data rates in networking environments.

Conventional SERDES system 100 also suffers from other problems, including eye closure due to intersymbol interference (ISI) from the dispersion introduced by transmission medium 110. The ISI is a direct result of the fact that the copper traces of transmission medium 110 attenuate higher frequency components in the transmitted signals more than the lower frequency components in the transmitted signals. Therefore, the higher the data rate the more ISI suffered by the transmitted data. In addition, electrical connectors and electrical connections (e.g., vias and other components) used in SERDES device 100 cause reflections, which also cause ISI.

To overcome these problems, equalization must be performed on the received signal in data recovery 115. However, in existing very high data-rate communication systems, equalization is very difficult to perform, if not impossible due to the high baud rate. A more commonly utilized technique for combating ISI is known as "pre-emphasis", or pre-equalization, performed in bit encoder 105 and output driver 107 during transmission. In some conventional systems, the amplitude of the low-frequencies in the transmitted signal is attenuated to compensate for the higher attenuation of the high frequency component by the transmission medium of bus 110. While this makes the receiver more robust to ISI, pre-emphasis reduces the overall noise tolerance of transmission over transmission medium 110 of communication system 100 due to the loss of signal-to-noise ratio (SNR). At higher data rates, conventional systems quickly become intractable due to the increased demands.

Another difficulty with conventional SERDES system 100 is with correction for near-end cross talk (NEXT) interference, Far-end cross talk interference (FEXT) and echo cancellation. NEXT interference relates to the interference between the transmitter portions of device 101-$q$, an arbitrary one of devices 101-1 through 101-Q, and the receiver portions of device 101-$q$, where the interfering transmitter portion is transmitting on a separate conductor from the receiver portion. Echo refers to the interference between the transmitter portions of device 101-$q$ and the receiver portions of device 101-$q$, where the transmitter portion is transmitting on the same wire as the receiver portion. FEXT refers to interference between transmitters of counterpart transmitter portions transmitting to the receiver portion of device 101-$q$. In many cases, transmitter 104 and receiver 108 of device 101-$q$ are adjacently located as transceiver SERDES device 101-1 and may share a bus line to bus 110. Further, in many cases device 101-$q$ is in communication with one or more counterpart ones of devices 101-1 through 101-Q that can provide interference to the receiver portion of device 101-$q$. For example, NEXT, FEXT and Echo interference can be problematic in systems utilizing category 5, 5E or 6 cabling, which are capable of supporting high transmission rates.

Therefore, there is a need for a more robust system for transmitting data in a transmission system at very high speeds.

SUMMARY

In accordance with the present invention, a transceiver is presented that allows very high data transmission rates over a data bus that utilizes the signal attenuation properties of the interconnect system and which corrects for interference at a receiver from the effects of transmitters other than the complementary transmitter to the receiver. This interference can include near-end cross talk (NEXT), far-end cross talk (FEXT) and/or Echo interference.

A transceiver can include one or more individual transmitters and one or more individual receivers, where at least some of the transmitters transmit data on a plurality of frequency separated channels. A transceiver according to the present invention includes an interference filter, which can include a NEXT, FEXT, and/or Echo filter, that corrects transmitted data received by each of the one or more receivers in the transceiver from interference generated by the one or more adjacent transmitters in the transceiver or from one or more adjacent transmitters to the complementary transmitter to the receivers of the transceiver.

Therefore, a transceiver according to the present invention includes a receiver portion including at least one receiver to receive signals from a complementary transmitter through a transmission medium, the at least one receiver including a plurality of demodulators to receive the signals from a corresponding plurality of frequency separated channels; and an interference filter coupled to the receiver portion to substantially reduce interference in signals received by the receiver portion that result from transmission coupled to each of the plurality of corresponding frequency separated channels from transmitters other than the complementary transmitter. The interference filter can include any number of filter, including a far-end cross-talk (FEXT) filter and a near-end cross-talk and echo filter.

A transmitter in accordance with the present invention can include any number of transmitters and at least one receiver. Each of the transmitters can be in communications with a complementary receiver of a separate transceiver. Additionally, each of the at least one receivers can be in communications with a complementary transmitter of a separate transceiver. Each receiver, then, is in communications with a complementary transmitter of a different transceiver and is adjacent to one or more transmitters with which it forms the transceiver. In some cases, all the transmitters and receivers from one transceiver will communicate with corresponding counterparts of a single far end transceiver.

In the data transmission system, a transmitter from a first transceiver is coupled with a receiver from a second transceiver through a transmission medium. The transmitter receives parallel data having N bits and separates the N bits into subsets for transmission. In some embodiments, the N-bits are separated into (K+1) subsets for transmission into the base band and K frequency separated channels. In some embodiments, the N-bits are separated into K subsets for transmission into K frequency separated channels. The transmitter is coupled to transmit signals on the transmission medium. The K subsets of data for transmission into the K frequency separated channels are up-converted to frequencies corresponding to those channels. The summed output signal resulting from the summation of the K up-converted channels and the base-band channel, if present, is transmitted over the transmission medium.

A receiver of the transceiver receives data from a complementary transmitter through the transmission medium. In some embodiments, data from the base-band and the K frequency separated channels from the transmission medium is received and the parallel bits of data transmitted by the complementary transmitter is recovered. In some embodiments, data from K separated channels is received from the transmission medium and the base-band channel is not utilized.

In addition to interference caused by near-end cross talk from adjacent transmitters, far end cross talk from other far end transmitters, and echo from a transmitter on the same conducting media (in the case of Cat-5, 5E or 6 cable or copper pair) to data received by a receiver in a transceiver according to the present invention, the data can further suffer from inter-symbol interference (ISI) as well as cross-channel interference. Cross-channel interference is due to harmonic generation in up-conversion and down-conversion processes between the communicating transmitter and receiver pair. Therefore, embodiments of the present invention can also include filters to address other interference mechanisms, for example intersymbol interference and cross-channel interference in the data.

These and other embodiments are further discussed below with respect to the following figures.

In the figures, elements designated with the same identifications on separate figures are considered to have the same or similar functions.

DETAILED DESCRIPTION

Figure 1A:
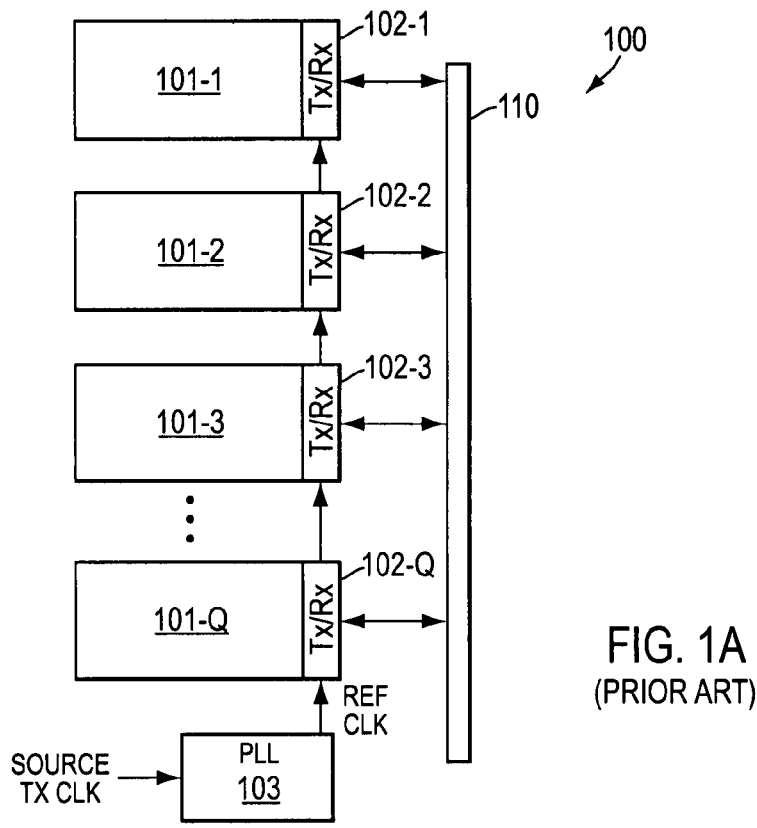
FIGS. 1A, 1B and 1C show block diagrams for a conventional system of transmitting data over a back-plane.
Figure 1B:
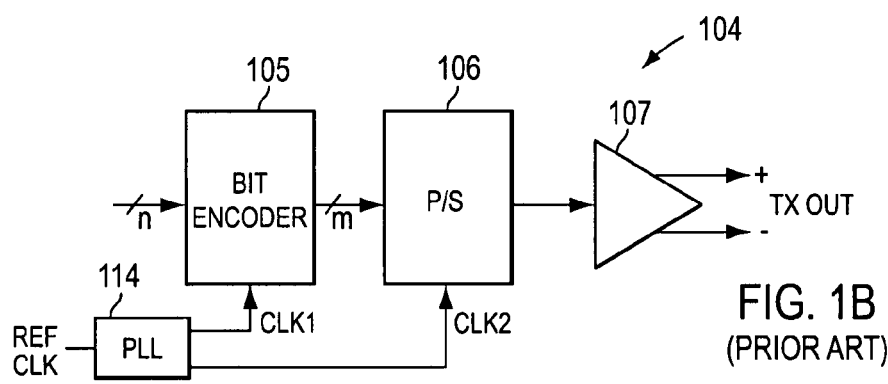
Figure 1C:
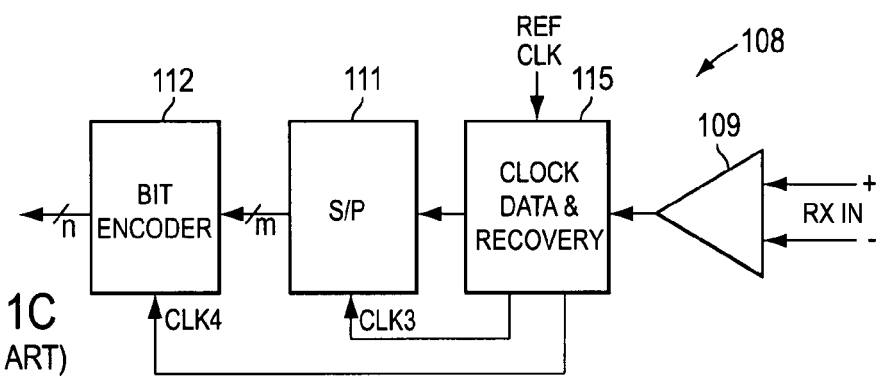
Figure 2A:
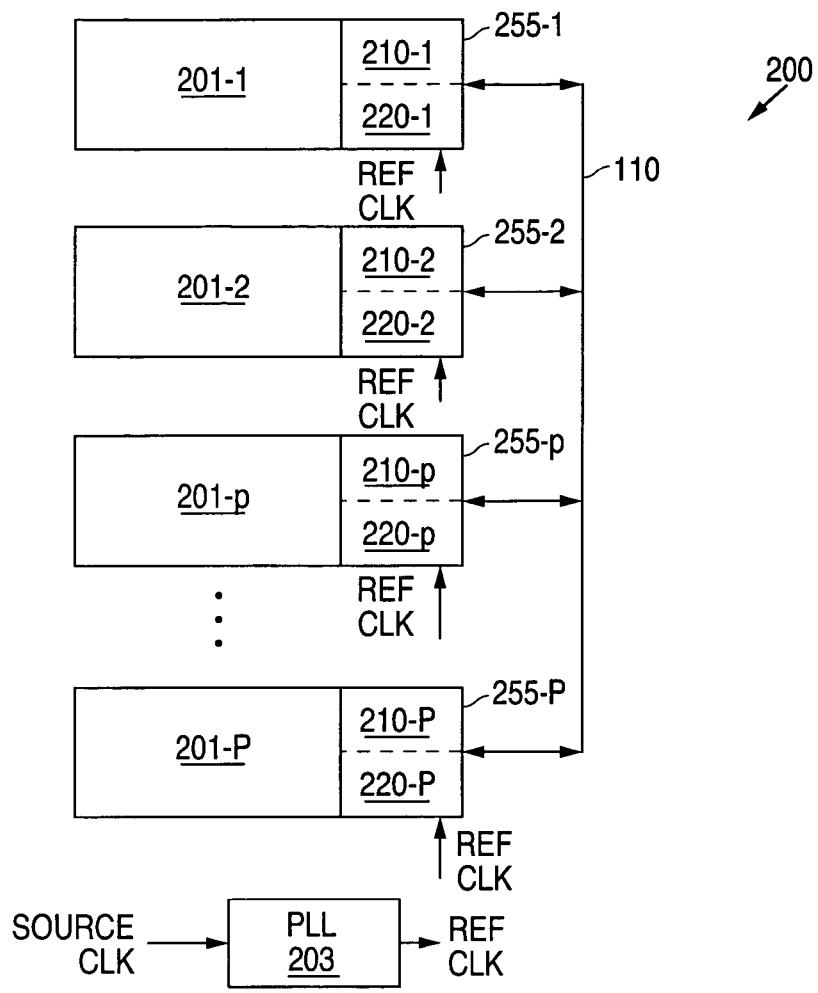
FIG. 2A shows a block diagram of a transmission system according to the present invention.

FIG. 2A shows a block diagram of a transmission system 200 according to the present invention. System 200 includes any number of components 201-1 through 201-P, with component 201-$p$ representing an arbitrary one of components 201-1 through 201-P, coupled through a transmission medium 110. Transmission medium 110 may couple component 201-$p$ to all of the components 201-1 through 201-P or may couple component 201-$p$ to selected ones of components 201-1 through 201-P. In some embodiments, individual transmitters and receivers of components 201-1 through 201-P are coupled together through category 5, 5E or 6 twisted copper pair. Further, in some embodiments, transmission medium 110 can include a router to form a transmission network, for example a hub and spoke network, for transmission of data between individual ones of components 201-1 through 201-P.

System 200 can represent any transmission system, for example a local area network (LAN), wide area network (WAN), digital subscriber loop, chassis-to-chassis digital communication system, or chip-to-chip interconnect with components 201-1 through 201-P representing individual computer systems, cards, cabinets, or chips.

Transmission channel 110 can represent any transmission channel, including optical channels, infrared channels, wireless channels, multiple twisted copper pair (such as Category-5, 5E or 6 cable), copper wire, FR4 copper traces, or copper based back-plane interconnect channel. Additionally, any conducting medium can be utilized in transmission channel 110. Transmission channel 110 may further include networking devices such as routers to direct connections between individual components. Typically, transmission channel 110 attenuates higher frequency signals more than lower frequency signals. As a result, intersymbol interference problems are typically greater for high data rate transmissions than for low data rate transmissions. In addition, cross-talk from neighboring signals increases with transmission frequency.

As an example, a transmission system utilizing multiple pairs of twisted copper pair is discussed in this disclosure. It should be noted that other transmission media in other transmission environments can be used for the transmission system.

Components 201-1 through 201-P include transceivers 255-1 through 255-P, respectively. Each of transceivers 255-1 through 255-P, in turn, includes transmitter portions 210-1 through 210-P, respectively, and receiver portions 220-1 through 220-P, respectively. Each of transmitter portions 210-1 through 210-P includes one or more individual transmitters according to the present invention and each of receiver portions 220-1 through 220-P includes one or more individual receivers according to the present invention. In some embodiments, certain ones of components 201-1 through 201-P may only include a transmitter portion and others may include only a receiver portion. Therefore, in some embodiments of transmission system 200, some of transmitter portions 210-1 through 210-P may be absent and some of receiver portions 220-1 through 220-P may be absent.

Figure 2B:
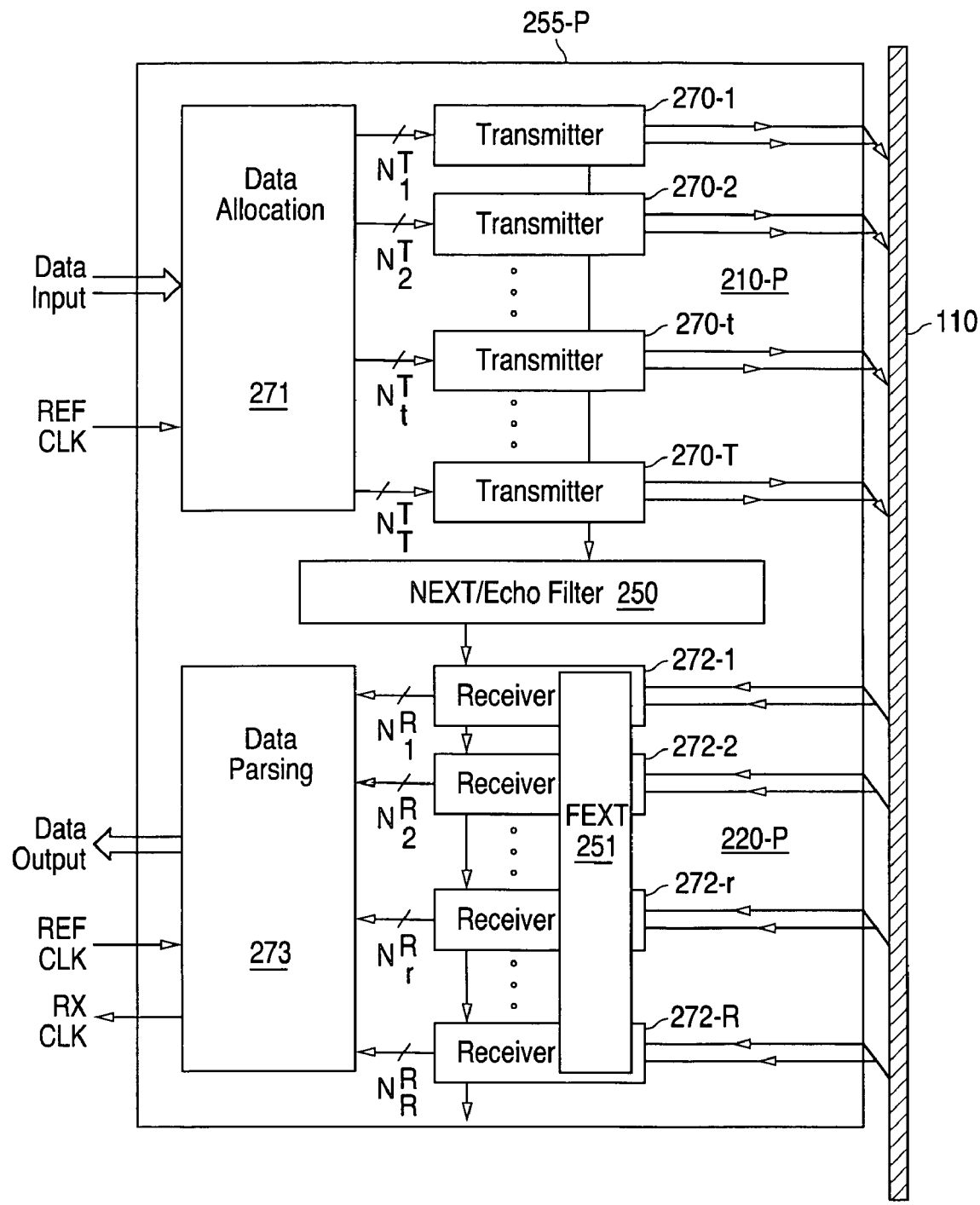
FIG. 2B shows a block diagram of a transceiver according to the present invention.

FIG. 2B shows an embodiment of transceiver 255-$p$, an arbitrary one of transceivers 255-1 through 255-P, according to the present invention. The embodiment shown in FIG. 2B includes filters for reducing the interference in signals received by receiver portion 220-$p$ from transmitters other than those involved in transmitting the signals interfering with those signals. In FIG. 2B, NEXT and Echo filters 250 as well as a FEXT filter 251 are shown. Generally, one or all of the filters may be present in an embodiment of transceiver 255-$p$ according to the present invention.

Transmitter portion 210-$p$ of transceiver 255-$p$ includes transmitters 270-1 through 270-T, with transmitter 270-$t$ indicating an arbitrary one of transmitters 270-1 through 270-T. Transmitter 270-$t$ receives $N_t^T$ bits from data allocation 271 and transmits data corresponding with the $N_t^T$ bits over transmission media 110. As shown in FIG. 2B, data from transmitter 270-$t$ in the embodiment shown is transmitted over a pair of wires.

Receiver portion 220-$p$ of transceiver 255-$p$ includes receivers 272-1 through 272-R, with receiver 272-$r$ indicating an arbitrary one of receivers 272-1 through 272-R. Receiver 272-$r$ receives data from transmission medium 110 and outputs $N_r^R$ bits to data parsing 273. Data parsing 273 outputs a data stream received by receiver portion 220-$p$ and a receive clock corresponding to the data stream. Note that the number of transmitters, T, and the number of receivers, R, in transceiver 255-$p$ need not be the same.

In some embodiments of the invention, a single copper pair of transmission medium 110 can be utilized to both transmit and receive. For example, transmitter 270-$t$ and receiver 272-$r$ may share a single pair of copper wire. This shared-wire configuration results in echo interference between transmitter 270-$t$ and receiver 272-$r$. Echo interference refers to the receipt of the transmitted signal from transmitter 270-$t$ at receiver 272-$r$ in the shared-wire configuration from two sources: The transmitted signal from transmitter 270-$t$ appears directly on receiver 272-$r$; and the reflection of the transmitted signal from transmitter 270-$t$ by the corresponding receiver to transmitter 270-$t$ (i.e., the receiver to which transmitter 270-$t$ is sending data) and by any other connections and impedance mismatches in transmission medium 110 that would reflect the transmitted signal back to be detected by receiver 272-$r$.

In addition to echo interference at receiver 272-$r$, each of transmitters 270-1 through 270-T may be closely enough spaced to receiver 272-$r$ such that signals transmitted by each of transmitters 270-1 through 270-T is received by receiver 272-$r$. Signals transmitted by transmitters 270-1 through 270-T can also be received by receiver 272-$r$ through the proximity of wires in transmission medium 110, for example because of signals from one copper pair leaking to another copper pair. Interference by receipt of signals from transmitters 270-1 through 270-T at receiver 272-$r$, or NEXT interference, therefore, may also be present.

Therefore, to correct for Next and echo interference, some embodiments of transceiver 255-$p$ can include a NEXT/Echo filter 250. NEXT/Echo filter 250 receives input data from each of transmitters 270-1 through 270-T and outputs correction data to each of receivers 272-1 through 272-R. In some embodiments, portions of NEXT/Echo filter 250 may be distributed throughout each of receivers 272-1 through 272-R. Next/Echo filter 250 corrects each of receivers 272-1 through 272-R for echo interference and NEXT interference caused by transmitters 270-1 through 270-T, especially if transmitter/receiver pairs share transmission media.

Receivers 272-1 through 272-R may also include a FEXT filter 251. FEXT filter 251 receives inputs from each of receivers 272-1 through 272-R and outputs correction data to each of receivers 272-1 through 272-R. FEXT filter 251, therefore, corrects for cross interference between transmitters corresponding to each of receivers 272-1 through 272-R (i.e., each of the transmitters that are transmitting data to receivers 272-1 through 272-R).

In operation, one or more of transmitters 270-1 through 270-T from component 201-$p$ is in communication with complementary receivers in others of components 201-1 through 201-P. Additionally, one or more of receivers 272-1 through 272-R can be in communication with complementary transmitters in others of components 201-1 through 201-P. Further, in some embodiments, timing for all of components 201-1 through 201-P can be provided by a phase-locked-loop (PLL) 203 synchronized to a transmit source clock signal. In some embodiments, PLL 203 provides a reference clock signal and each of components 201-1 through 201-P can include any number of phase locked loops to provide internal timing signals.

In some embodiments, each of components 201-1 through 201-P will have its own reference clock, which is compensated with a frequency adjustment circuit. As discussed in U.S. patent application Ser. No. 10/410,255, filed on Dec. 4, 2002, and U.S. patent application Ser. No. 10/167,158, filed on Jun. 10, 2002, each of which is herein incorporated by reference in their entirety, the timing between components 201-1 through 201-P is matched such that the base-band frequencies are the same for each of components 201-1 through 201-P and the up-conversion and down-conversion mixers between complementary transmitter/receiver pairs operate at the same frequency. The complexity of systems where each of components 201-1 through 201-P operate at different frequencies may be highly increased.

In some systems, for example back-plane systems or cabinet interconnects, the transmission distance through transmission channel 110, i.e., the physical separation between components 201-1 through 201-P, can be as low as 1 to 1.5 meters. In some chip-to-chip environments, the physical separation between components 201-1 though 201-P can be much less (for example a few millimeters or a few centimeters). In local area network or wide area network applications, separations between components 201-1 through 201-P can be up to 100 m for LAN and several kilometers for WAN applications. Furthermore, in some embodiments transmission channel 110 can be multiple twisted copper pair (or any other current carrying wire configuration) carrying differential signals between components 201-1 through 201-P, for example category 5, 5E or 6 cabling. In some embodiments, components 201-1 through 201-P can share wires so that fewer wires can be utilized. In some embodiments, however, dedicated conducting paths can be coupled between at least some of components 201-1 through 201-P. Further, transmission medium 110 can be an optical medium, wireless medium, or data bus medium.

Each of transmitters 270-1 through 270-T and receivers 272-1 through 272-R of transceiver 255-$p$ can be in communication with complementary transmitters and receivers from one or more transceivers of components 201-1 through 201-P. For example, each of transmitters 270-1 through 270-T may be in communication with complementary receivers of one or more of components 201-1 through 201-P. Furthermore, each of receivers 272-1 through 272-R is in communication with complementary transmitters from one or more of components 201-1 through 201-P, but not necessarily all from the same one of components 201-1 through 201-P. It should be noted that transmitter 210-$p$ and receiver 220-$p$ can communicate separately with any combination of receivers and transmitters, respectively, of transceivers 255-1 through 255-P of components 201-1 through 201-P, respectively. In the particular embodiments discussed in this disclosure, each of components 201-1 through 201-P are in communications with a complementary counterpart one of components 201-1 through 201-P.

Figure 2C:
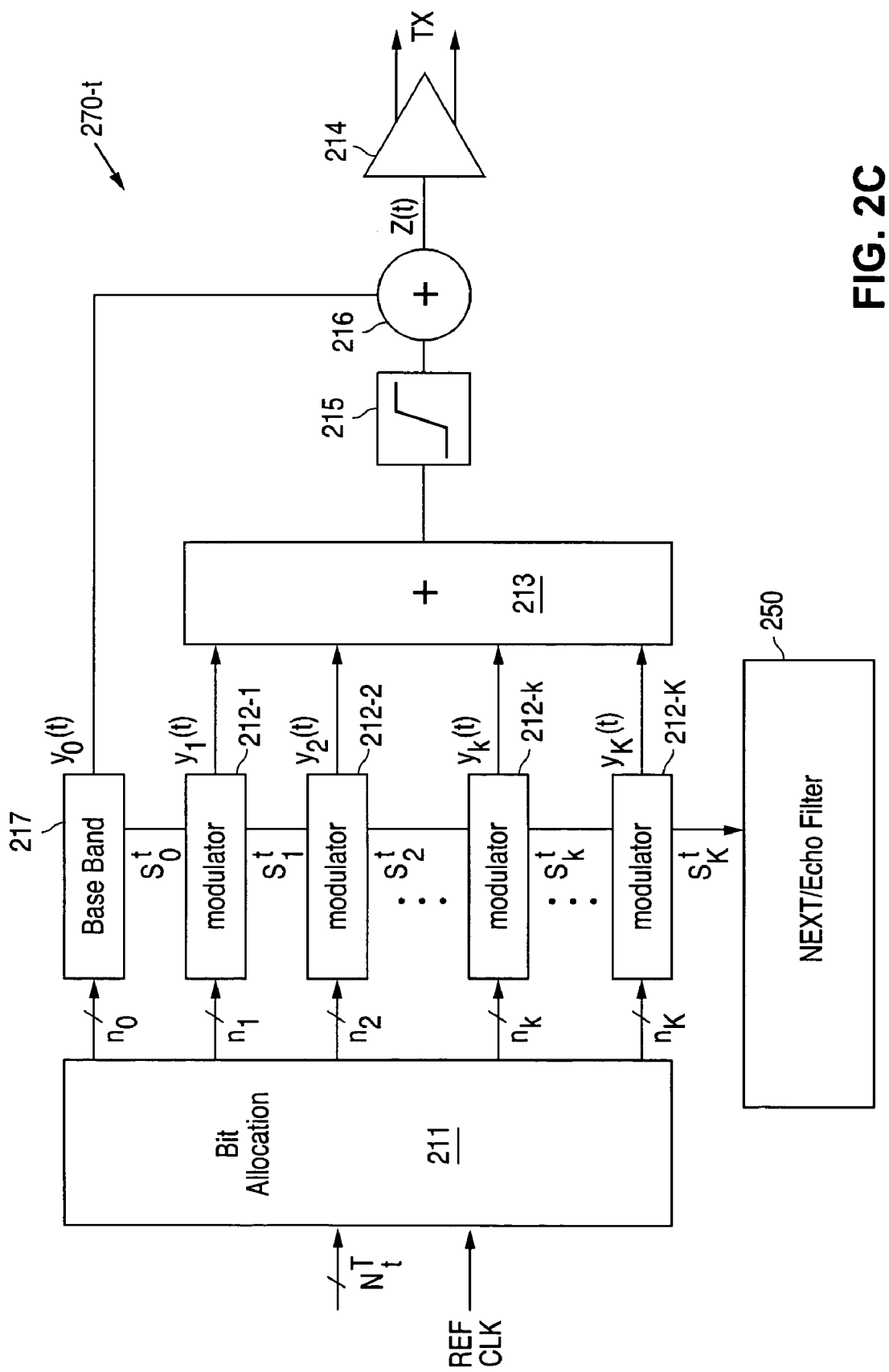
FIG. 2C shows a block diagram of a transmitter of the transceiver shown in FIG. 2B according to the present invention.

FIG. 2C shows a block diagram of an embodiment of transmitter 270-$t$, an arbitrary one of transmitters 270-1 through 270-T included in transceiver 255-$p$, according to the present invention. Transceiver 255-$p$ is an arbitrary one of transceivers 255-1 through 255-P. For ease of discussion, the subscripts on designations of individual elements indicating particular transceiver and which transmitter or receiver in the particular transceiver may be neglected, but will be added if it clarifies the discussion. The particular transmitter or receiver and transceiver is clear in context and discussions with regard to a particular transmitter or receiver component can be extended to other transmitters and receivers.

Transmitter 270-$t$ receives an $N_t^T$-bit parallel data signal at a bit allocation block 211 to be transmitted over media 110. Bit allocation block 211 also receives the reference clock signal from PLL 203. Bit allocation block 211 segregates the $N_t^T$ input bits into groups of bits allocated to the multiple channels. In the embodiment shown in FIG. 2C, allocation block 211 segregates the $N_t^T$ input bits into K+1 individual channels such that there are $n_t$ through $n_K$ bits input to up-converting modulators 212-1 through 212-K, respectively, and $n_0$ bits input to base-band modulator 217. Some embodiments do not include base-band modulator 217. Base-band modulator 217 and up-converting modulators 212-1 through 212-K, collectively, transmit into (K+1) channels. In some embodiments, each of the $N^T$ bits is assigned to one of the K+1 individual channels so that the sum of $n_0$ through $n_K$ is the total number of bits $N_t^T$. In some embodiments, bit allocation block 211 may include error coding, redundancy, or other overall encoding such that the number of bits output by bit allocation block 211, i.e., $$\sum_{i=0}^{K} n_i,$$

is greater than $N_t^T$.

Each of up-converting modulators 212-1 through 212-K encodes the digital data input to it and outputs a signal modulated at a different carrier frequency. Therefore, the $n_k$ digital data bits input to up-converting modulator 212-$k$, an arbitrary one of up-converting modulators 212-1 through 212-K of transmitter 270-$t$, is output as an analog signal in a kth transmission channel at a carrier frequency $f_k$. Additionally, baseband modulator 217, if present, transmits into the base-band channel. A discussion of embodiments of transmitter 270-t is further included in U.S. application Ser. No. 09/904,432, filed on Jul. 11, 2001, U.S. application Ser. No. 09/965,242, filed on Sep. 26, 2001, application Ser. No. 10/071,771, filed on Feb. 6, 2002, and application Ser. No. 10/310,255, filed on Dec. 4, 2002, each of which is assigned to the same assignee as is the present disclosure and is herein incorporated by reference in its entirety.

Figure 3:
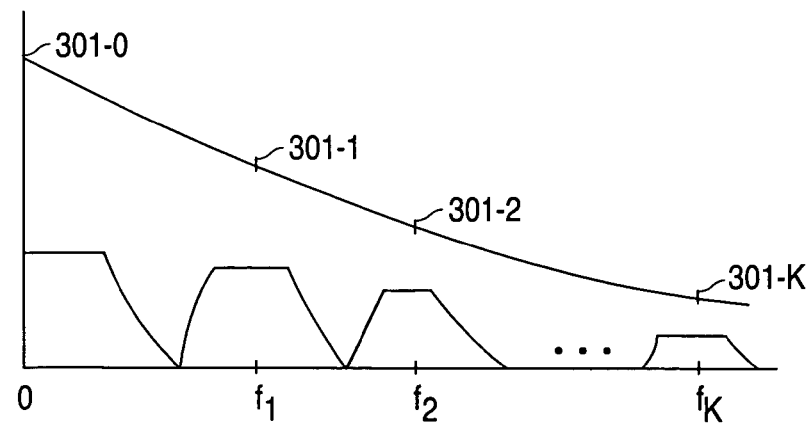
FIG. 3 shows a graph of attenuation versus transmission band on the transmission medium according to the present invention.

FIG. 3 shows schematically the transport function for a typical transmission channel, H(f), of transmission medium 110. As is shown, the attenuation at higher frequencies is greater than the attenuation at lower frequencies. Up-converting modulators 212-1 through 212-K transmit analog data at carrier frequencies centered about frequencies $f_1$ through $f_K$, respectively. Therefore, modulators 212-1 through 212-K transmit into transmission channels 301-1 through 301-K, respectively. Base-band modulator 217 transmits into transmission channel 301-0, which is centered at 0 frequency. In some embodiments, the width of each of transmission channels 301-0 through 301-K can be the same. The width of the bands of each of transmission channels 301-0 through 301-K can be narrow enough so that there is little to no overlap between adjacent ones of transmission channels 301-0 through 301-K. In some embodiments, since the attenuation for the lower frequency channels is much smaller than the attenuation for the higher frequency channels, lower frequency channels can be bit-loaded to carry a higher number of bits per baud interval than the number of bits per baud interval that can be carried at higher carrier frequencies.

As shown in FIG. 2C, the analog output signal from each of up-converting modulators 212-1 through 212-K, $y_1(t)$ through $y_K(t)$, then represents the transmission signal in each of channels 301-1 through 301-K, respectively. Signals $y_1(t)$ through $y_K(t)$, then, are input to summer 213 and the summed analog signal output from summer 213 can be input to a high pass filter 215. The output signal from high pass filter 215 is input to summer 216 where it is summed with the base-band signal $y_0(t)$ from base-band modulator 217. High pass filter 215 prevents up-converting modulators 212-1 through 212-K from transmitting signals into the base-band channel and reduces or eliminates the need to consider cross-channel interference between signals produced by base-band modulator 217 and those generated by up-converting modulators 212-1 through 212-K.

The output signal from summer 216, z(t), is input to an output driver 214. In some embodiments, output driver 214 generates a differential transmit signal corresponding to signal z(t) for transmission over transmission medium 110. Output driver 214, if transmission medium 110 is an optical medium, can also be an optical driver modulating the intensity of an optical signal in response to the signal z(t). The signal z(t), after transmission through transmission medium 110, is received by a complementary receiver in one of components 201-1 through 201-P.

Figure 2D:
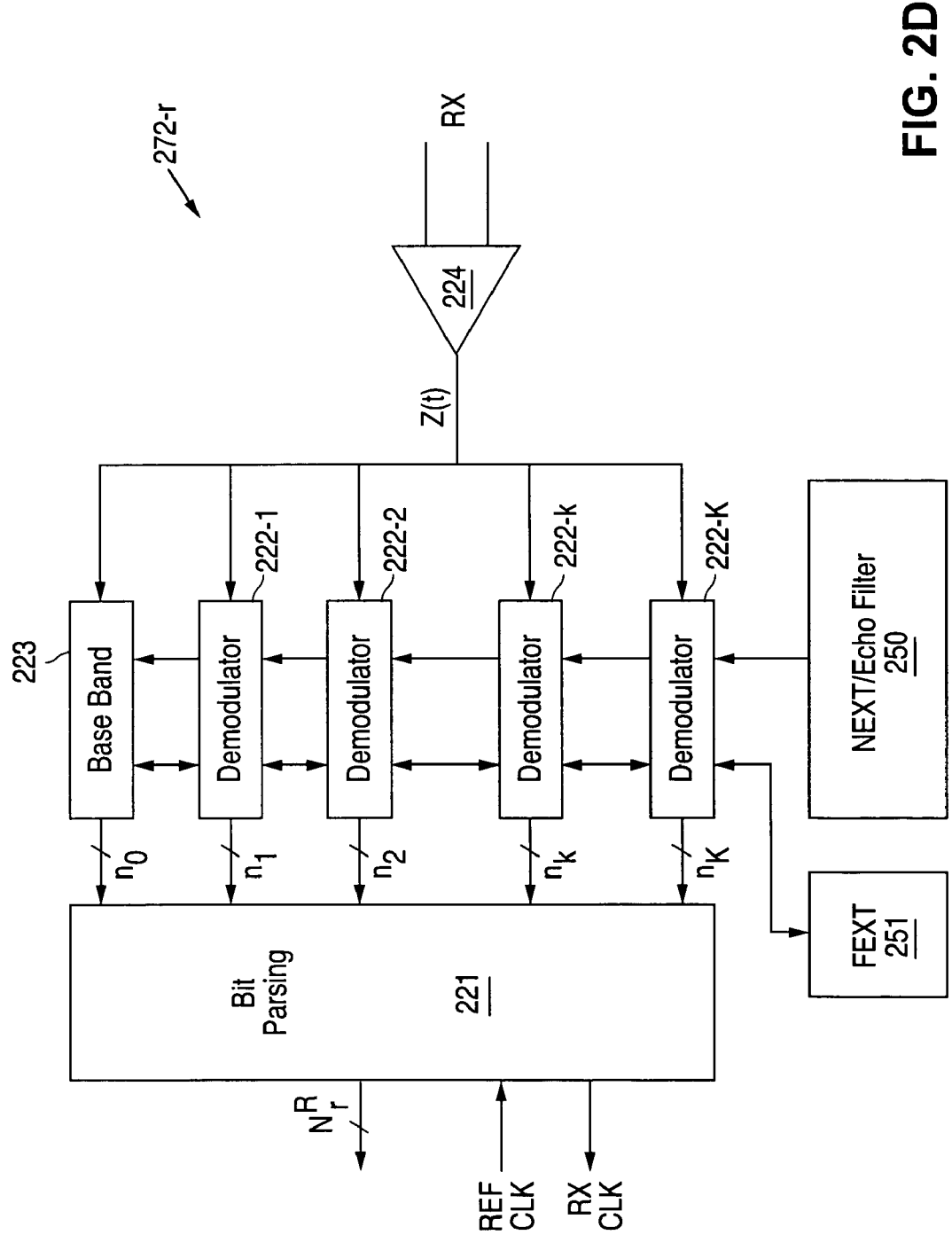
FIG. 2D shows a block diagram of a receiver of the transceiver shown in FIG. 2B according to the present invention.

FIG. 2D shows an example of a receiver 272-r of receiver portion 220-p of transceiver 255-p. Receiver 272-r can receive a differential receive signal, which originated from a complementary transmitter from another of components 201-1 through 201-P, into an input buffer 224. In some embodiments, an optical signal can be received at input buffer 224, in which case input buffer 224 includes an optical detector. The output signal from input buffer 224, Z(t), is closely related to the output signal from the complementary transmitter, but shows the effects of transmission through transmission medium 110, including intersymbol interference (ISI). Additionally, near-end crosstalk interference and possibly Echo interference from the signals transmitted by transmitter 210-p of transceiver 255-p will also be included in signal Z(t). Also, the signal Z(t) may include FEXT interference resulting from signals transmitted by transmitters adjacent to the complementary transmitter.

The signal Z(t) is input to each of down-converting demodulators 222-1 through 222-K and into base-band demodulator 223. Down-converting demodulators 222-1 through 222-K demodulate the signals from each of the transmission channels 301-1 through 301-K, respectively, and recovers the bit stream from each of carrier frequencies $f_1$ through $f_K$, respectively. Base-band demodulator 223 recovers the bit stream which has been transmitted into the base-band channel, if the base-band channel is present. The output signals from each of down-converting demodulators 222-1 through 222-K, then, include $n_1$ through $n_K$ parallel bits, respectively, and the output signal from base-band demodulator 223 include $n_0$ parallel bits. In the embodiment shown in FIG. 2D, each of base-band demodulator 223 and down-converting demodulators 222-1 through 222-K can be coupled to Next/Echo filter 250, can be coupled to FEXT filter 251, and can be coupled to receive signals from each of the others of base-band demodulator 223 and down-converting demodulators 222-1 through 222-K. Therefore, in some embodiments each of base-band demodulator 223 and down-converting demodulators 222-1 through 222-K can correct for NEXT and Echo interference, FEXT interference, and cross-channel coupling interference. As discussed above, embodiments of receiver 272-r according to the present invention can include one or more of Next/Echo filter 250 and FEXT filter 251.

Although the examples discussed here describe a transmitter with (K+1) channels and a receiver with (K+1) channels, one skilled in the art will recognize that transmitter 270-t of transceiver 255-p shown in FIG. 2C and receiver 272-r of transceiver 255-p may use different numbers of transmission channels centered upon different transmission frequencies $f_1$ through $f_K$. A complementary transceiver/receiver pair (i.e., transmitter 270-t and the receiver coupled to transmitter 270-t through transmission medium 110, or receiver 272-r and the transmitter coupled to receiver 272-r through transmission medium 110) utilizes a common set of transmission channels. In the embodiments specifically described below, the transmission frequencies $f_1$ through $f_K$ for each of transceivers 255-1 through 255-P are integral multiples of a frequency $f_0$.

As shown in FIG. 2D, the output signals from base-band demodulator 223 and down-converting demodulators 222-1 through 222-K are input to bit parsing 221 where the transmitted signal having $N_r^R$ parallel bits is reconstructed. Receiver 272-r also receives the reference clock signal from PLL 203, which can be used to generate internal timing signals. Furthermore, receiver system 220-p outputs a receive clock signal with the N-bit output signal from bit parsing 221. In some embodiments, each of transceivers 255-1 through 255-P includes timing recovery in order to match the data transmission timing between complementary transmitter/receiver pairs. In embodiments where each of transmitters 270-1 through 270-T is in communication with complementary receivers of another transceiver and receivers 272-1 through 272-R are in communication with complementary transmitters of the same other transceiver, timing can be matched between transceiver pairs.

Down-converting demodulators 222-1 through 222-K, and in some embodiments base-band demodulator 223, can be further coupled so that cross-channel interference can be cancelled. In embodiments where filter 215 of transmitter 210-$p$ is not present or does not completely remove the base-band from the output signal of adder 213, then cross-channel interference in the base-band channel also may need to be considered. Due to the mixers in the up-conversion process, multiple harmonics of each signal may be generated from each modulator in the complementary transmitter. For example, using an embodiment of transmitter 270-$t$ as an example, up-converting modulators 212-1 through 212-K can transmit at carrier frequencies $f_1$ through $f_K$ equal to $f_0$, $2f_0$ .... $Kf_0$, respectively. Base-band modulator 217 transmits at the base-band frequency, e.g. base-band modulator 217 transmits with $n_0$ carrier.

Due to the harmonics in the mixer of transmitter 272-$r$, the signal transmitted at carrier frequency $f_1$ will also be transmitted in the base band and at frequencies $2f_1$, $3f_1$, ..... Additionally, the signal transmitted at carrier frequency $f_2$ will also be transmitted in the base band and at $2f_2$, $3f_2$, .... Therefore, any time any of the bandwidth of any harmonics of the channels overlap with other channels or the other channel's harmonics, significant cross-channel symbol interference can occur due to harmonics in the mixers of up-converting modulators 212-1 through 212-K. For example, in the case where the carrier frequencies are multiples of $f_0$, channel 1 transmitting at $f_0$ will also transmit at 0, $2f_0$, $3f_0$, ..., i.e. into each of the other channels.

Similarly, the complementary transmitter to receiver 272-$r$ will generate cross-channel interference. Additionally, the down converters of down-converting demodulators 222-1 through 222-K of receiver 272-$r$ also create harmonics, which means that some of the transmission of the third channel will be down-converted into the first channel, for example. Therefore, further cross-channel interference can be generated in the down-conversion process of receivers 221-1 through 221-K of transceiver 255-$p$. Some embodiments of the present invention correct for the cross-channel symbol interference as well as the inter-symbol interference. Note that it is well known that if the duty cycle of the harmonic wave that is being mixed with an input signal is 50%, only odd harmonics will be generated. Even harmonics require higher or lower duty cycles.

In some embodiments, the symbol baud rates for each of channels 301-0 through 301-K can be the same. In some embodiments, bit-loading can be accomplished by varying the symbol sets for lower frequency components such that a higher number of bits can be encoded.

As shown in FIGS. 2B and 2C, a signal from each of base-band modulator 217 and up-converting modulators 212-1 through 212-K from each of transmitters 270-1 through 270-T are input to NEXT/Echo filter 250. NEXT/Echo filter 250, which in some embodiments can be distributed through base-band demodulator 223 and down-converting demodulators 222-1 through 222-K of each of receivers 272-1 through 272-R, calculates corrections to the data received by each of receivers 272-1 through 272-R. The data received in each of base-band demodulators 223 and down-converting demodulators 222-1 through 222-K of receiver 272-$r$, for example, is corrected by NEXT/Echo filter 250 for near-end cross talk and echo interference.

For many of the same reasons discussed above with respect to a cross-channel interference filter, each of base-band modulator 217 and up-converting modulators 212-1 through 212-K may interfere with each of base-band demodulator 223 and down-converting demodulators 222-1 through 222-K, even if they operate at different frequencies. Due to the harmonics, interference at one modulator frequency may interfere with receive signals at different demodulator frequencies. In embodiments of the invention where one of transmitters 270-1 through 270-T shares a single connection in transmission medium 110 with one of receivers 272-1 through 272-R, then correction for echo interference may also be accomplished by NEXT/Echo filter 250. Again, due to the harmonics, each of base-band demodulator 223 and down-converting demodulators 222-1 through 222-K can be corrected for each of base-band modulators 217 and up-converting modulators 212-1 through 212-K of a transmitter 270-$t$ which shares the connection.

Additionally, FEXT filter 251 corrects for interference from transmitters adjacent to the transmitter coupled to receiver 272-$r$. For many of the same reasons as above, other transmitters which are adjacent to the complementary transmitter of receiver 272-$r$ interfere with signals received by each of base-band demodulator 223 and down-converting demodulators 222-1 through 222-K of receiver 272-$r$.

Figure 4A:
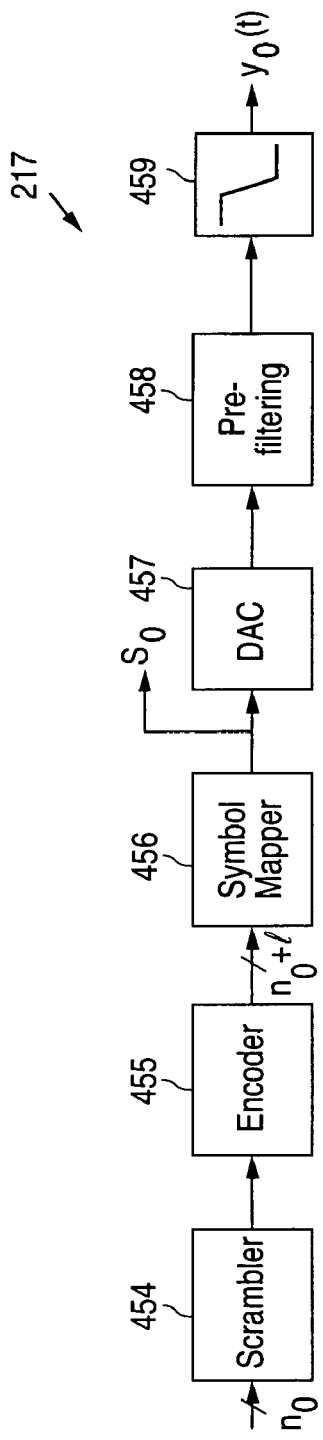
FIGS. 4A and 4B show block diagrams of embodiments of transmission modulators according to the present invention.

FIG. 4A shows an embodiment of base-band modulator 217 of transmitter 270-$t$ (FIG. 2C). Base-band modulator 217 may include a scrambler 454 and encoder 455. Scrambler 454 functions to whiten the data. Encoder 455 encodes the $n_0$ bits input to base-band modulator 217 to $n_0+1$ bits. The output signal from encoder 455 is then input to symbol mapper 456. Symbol mapper 456 converts the $n_0+1$ parallel bits into a symbol for transmission. In some embodiments, symbol mapper 456 can be a PAM encoder. The PAM symbol set can be of any size. In some embodiments, for example, a 16 level symbol set (16-PAM) can be utilized to represent $n_0+1=4$ parallel bits. Encoder 455 can provide ¾ encoding or no encoding. The output signal from symbol mapper 456 is input to digital-to-analog converter 457 which converts the symbol set determined by symbol mapper 456 into the corresponding output voltages.

In some embodiments, the analog output signal from DAC 457 is prefiltered through filter 458. In some embodiments, filter 458 may prepare the output signal for transmission through medium 110 (see FIG. 2A) so that the signal received by a receiver is corrected for distortions caused by the channel. For example, if the base-band channel of transmission medium 110 is known to have a transfer function of $(1+D(z))$, then filter 458 may execute a transfer function equal to $1/(1+D(z))$ in order to cancel the transfer function of transmission medium 110. The output signal from filter 458 can be input to low-pass filter 459. Filter 459 removes the higher frequency content, which may interfere with transmissions on the higher frequency channels. The output signal from filter 459 is the base band signal $y_0(t)$. With a combination of low pass filter 459 and high pass filter 215 coupled to summer 213, cross-channel interference between the base band channel, channel 301-0, and higher frequency channels 301-1 through 301-K can be minimized or eliminated.

Figure 4B:
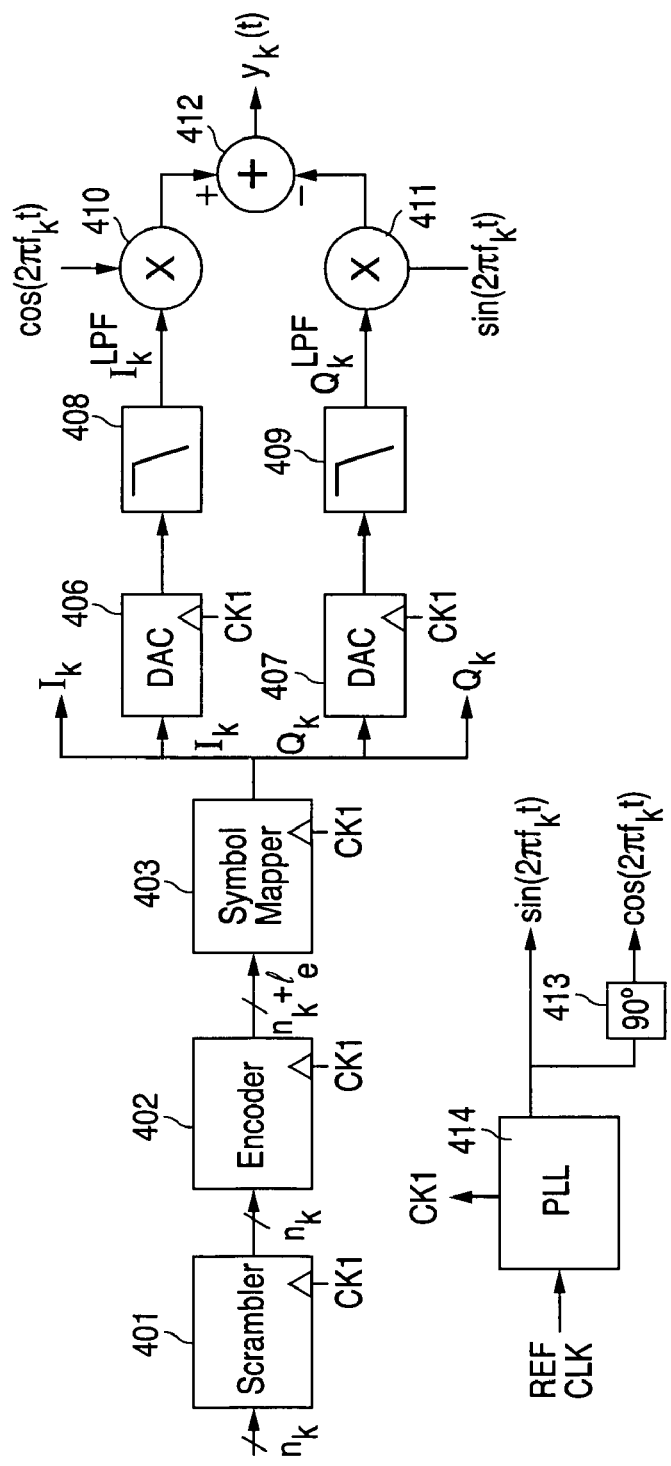

FIG. 4B shows a block diagram of an embodiment of up-converting modulator 212-$k$, an arbitrary one of up-conversion modulators 212-1 through 212-K of transmitter 270-$t$ (FIG. 2C). Up-converting modulator 212-$k$ receives $n_k$ bits per baud interval, $1/B_k$, for transmission into sub-channel 301-$k$. The parameter $B_k$ denotes the baud rate, or symbol rate, of the transmission. The $n_k$ bits are received in scrambler 401. Scrambler 401 scrambles the $n_k$ bits and outputs a scrambled signal of $n_k$ bits, which whitens the data.

The output signal of $n_k$ parallel bits from scrambler 401 is then input to encoder 402. Although any encoding scheme can be utilized, encoder 402 can be a trellis encoder for the purpose of providing error correction capabilities. Trellis coding allows for redundancy in data transmission without increase of baud rate, or channel bandwidth. Trellis coding is further discussed in, for example, BERNARD SKLAR, DIGITAL COMMUNICATIONS, FUNDAMENTALS AND APPLICATIONS (Prentice- Hall, Inc., 1988), G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February 1987, pp. 12-21. Other encoding schemes include block coding schemes such as Reed-Solomon encoders, and BCH encoders, see, e.g., G. C. CLARK, JR., AND J. B. CAIN., ERROR CORRECTION CODING FOR DIGITAL COMMUNICATIONS (Plenum Press, New York, 1981), however they result in an increase of channel bandwidth usage. Typically, the signal output from encoder 402 includes more bits than $n_k$, $n_k$+1e. In some embodiments, encoder 402 can be a trellis encoder which adds one additional bit, in other words encoder 402 can be a rate $n_k/n_k+1$ encoder, see, e.g., G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February 1987, pp. 12-21. In some embodiments, additional bits can be added to insure a minimum rate of transitions so that timing recovery can be efficiently accomplished at receiver 220-$p$. Typically, the encoder is referred to as an $n_k/n_k$+1e encoder.

The output signal from encoder 402 is input to symbol mapper 403. Symbol mapper 403 can include any symbol mapping scheme for mapping the parallel bit signal from encoder 402 onto symbol values for transmission. In some embodiments, symbol mapper 403 is a QAM mapper which maps the ($n_k$+1e) bits from encoder 402 onto a symbol set with at least $2^{(n_k+le)}$ symbols. A trellis encoder for encoder 402 in conjunction with a QAM mapper for symbol mapper 403 can provide a trellis encoded QAM modulation for sub-channel 301-$k$.

The encoded output bits from encoder 402 are input to mapper 403. In an example where $n_k$=6 and 1e=1, 7 bits from encoder 402 are input to mapper 403. If encoder 402 is the 16 state, rate 2/3 encoder discussed above, the 3 bit output of encoder 402 can be the 3 most-significant bits (MSBs) and the 4 uncoded bits can be the least-significant bits (LSBs).

In some embodiments, a 16 symbol QAM scheme can be utilized. In those embodiments, 4 bits with no encoding (or 3 bits in an 3/4 encoding scheme) can be directly mapped onto 16 QAM symbols. In some embodiments, 4 bits can be encoded (with a 4/5 encoding scheme) into a 32 QAM symbol set. In general, any size symbol set can be utilized.

The output signal from symbol mapper 403 can be a complex signal represented by in-phase signal $I_k(v)$ and a quadrature signal $Q_k(v)$, where v is an integer that represents the vth clock cycle of the clock signal CK1, whose frequency equals the baud rate $B_k$. Each of signals $I_k(v)$ and $Q_k(v)$ are digital signals representing the values of the symbols they represent. In some embodiments, a QAM mapper onto a constellation with 128 symbols can be utilized. Other constellations and mappings are well known to those skilled in the art, see, e.g., BERNARD SKLAR, DIGITAL COMMUNICATIONS, FUNDAMENTALS AND APPLICATIONS (Prentice-Hall, Inc., 1988) and E. A. LEE AND D. G. MESSERSCHMITT, DIGITAL COMMUNICATIONS (Kluwer Academic Publishers, 1988). The number of distinct combinations of $I_k(v)$ and $Q_k(v)$, then, represents the number of symbols in the symbol set of the QAM mapping and their values represent the constellation of the QAM mapping. Further examples of QAM symbol sets include 16 QAM symbol sets (16-QAM) and 4/5 encoded 32-QAM symbol sets (4/5 encoded 32 QAM).

The signals from symbol mapper 403, $I_k(v)$ and $Q_k(v)$, are input to digital-to-analog converters (DACs) 406 and 407, respectively. DACs 406 and 407 operate at the same clock rate as symbol mapper 403. In some embodiments, therefore, DACs 406 and 407 are clocked at the symbol rate, which is the transmission clock frequency $B_k$. The analog output signals from DACs 406 and 407, represented by $I_k(t)$ and $Q_k(t)$, respectively, can be input to low-pass filters 408 and 409, respectively. Low pass filters 408 and 409 are analog filters that pass the symbols represented by $I_k(t)$ and $Q_k(t)$ in the base band while rejecting the multiple frequency range reflections of the base band signal.

The output signals from low-pass filters 408 and 409, designated $I_k^{LPF}(t)$ and $Q_k^{LPF}(t)$, respectively, are then up-converted to a center frequency $f_k$ to generate the output signal of $y_k(t)$, the kth channel signal. The output signal from low-pass filter 408, $I_k^{LPF}(t)$, is multiplied by $\cos(2\pi f_k t)$ in multiplier 410. The output signal from low-pass filter 409, $Q_k^{LPF}(t)$, is multiplied by $\sin(2\pi f_k t)$ in multiplier 411. The signal $\sin(2\pi f_k t)$ can be generated by PLL 414 based on the reference clock signal and the signal $\cos(2\pi f_k t)$ can be generated by a $\pi/2$ phase shifter 413.

However, because mixers 410 and 411 are typically not ideal mixers and the sine wave input to mixer 410, and the resulting cosine wave input to mixer 411, often varies from a sine wave; signals having harmonics of the frequency $f_k$ are also produced. Often, the harmonic signals input to mixers 410 and 411 may more closely resemble square-wave signals than sine wave signals. Even if the "sine wave input" is a true sine wave, the most commonly utilized mixers, such as Gilbert Cells, may act as a band-limited switch, resulting in a harmonic signal with alternating positive and negative voltages with frequency the same as the "sine wave input" signal. Therefore, the output signals from filters 408 and 409 are still multiplied by signals that more closely resemble square waves than sine waves. As a result, signals having frequency $2f_k$, $3f_k$, ... are also produced, as well as signals in the base band ($0f_k$). Although the amplitude of these signals may be attenuated with higher harmonics, they are non-negligible in the output signal. Additionally, even harmonics (i.e., $0f_k$, $2f_k$, $4f_k$...) are absent if the duty cycle of the harmonic sine wave input to mixers is 50%. Otherwise, some component of all of the harmonics will be present.

The output signals from multipliers 410 and 411 are summed in summer 412 to form $$y_k(t) = \xi_k^0 I_k^{LPF}(t) - \zeta_k^0 Q_k^{LPF}(t) + \sum_{n>0}(\xi_k^n I_k^{LPF}\cos(2\pi n f_k t) - \zeta_k^n Q_k^{LPF}\sin(2\pi n f_k t))(k \geq 1). \quad (1)$$

where $\xi_k^n$ and $\zeta_k^n$ is the contribution of the nth harmonic to $y_k(t)$. If the duty cycle of the harmonic input signals to mixers 410 and 411 is near 50%, the even harmonics are low and the odd harmonics are approximately given by $\xi_k^n=1/n$ and $\zeta_k^n=1/n$.

The overall output of transmitter 210-$p$ (FIG. 2B), the output from summer 216, is then given by $$z(t) = \sum_{k=0}^{K} y_k(t). \quad (2)$$

In an example where the frequencies $f_1$ through $f_K$ are given by frequencies $f_0$ through $(Kf_0)$, respectively, then, the overall output signal z(t) from transmitter 210-$p$ is given by:

$$z(t) = \qquad (3)$$

$$y_0(t) + \sum_{k=1}^{K}(\xi_k^0 I_k^{LPF}(t) - \zeta_k^0 Q_k^{LPF}) + \xi_1^1 I_1^{LPF}(t)\cos\omega_0 t - \zeta_1^1 Q_1^{LPF}(t)\sin\omega_0 t + (\xi_1^2 I_1^{LPF}(t) + \xi_2^1 I_2^{LPF}(t))\cos 2\omega_0 t - (\zeta_1^2 Q_1^{LPF}(t) + \zeta_2^1 Q_2^{LPF}(t))\sin 2\omega_0 t + (\xi_1^3 I_1^{LPF}(t) + \xi_3^1 I_3^{LPF}(t))\cos 3\omega_0 t - (\zeta_1^3 Q_1^{LPF}(t) + \zeta_3^1 Q_3^{LPF}(t))\sin 3\omega_0 t + (\xi_1^4 I_1^{LPF}(t) + \xi_2^2 I_2^{LPF}(t) + \xi_4^1 I_4^{LPF}(t))\cos 4\omega_0 t - (\zeta_1^4 Q_1^{LPF}(t) + \zeta_2^2 Q_2^{LPF}(t) + \zeta_4^1 Q_4^{LPF}(t))\cos 4\omega_0 t + \ldots = y_0(t) + \sum_{k=1}^{K}(\xi_k^0 I_k^{LPF}(t) - \zeta_k^0 Q_k^{LPF}(t)) + \sum_{M=1}^{\infty}\sum_{\forall k,n\in k^* n=M}(\xi_k^n I_k^{LPF}(t)\cos M\omega_0 t - \zeta_k^n Q_k^{LPF}(t)\sin M\omega_0 t)$$

where $\omega_0$ is $2\pi f_0$ and where $I_k^{LPF}(t)$ and $Q_k^{LPF}(t)$ are 0 for all k>K.

As shown in Equation 3, the signal on channel one is replicated into all of the higher K channels, the base-band, and into harmonic frequencies beyond the base-band and the K channels. Filter 215 can remove the contribution to the base-band channel from up-converting modulators 212-1 through 212-K. The signal on channel two, for example, is also transmitted on channels 4, 6, 8, . . . , and the base-band. The signal on channel 3 is transmitted on channels 6, 9, 12, . . . and the base-band. In general, the signal on channel k will be mixed into channels $2k$, $3k$, . . . and the base-band. Further, the attenuation of the signals with higher harmonics in some systems can be such that the signal from channel k is non negligible for a large number of harmonics, potentially up to the bandwidth of the process, which can be 30-40 GHz.

In some embodiments of the invention, a high pass filter 215 (see FIG. 2C) receives the signal from summer 213. High pass filter 215 can, for example, be a first-order high-pass filter with 3 dB attenuation at $f_1/2$. Filter 215 removes the DC harmonics, i.e. the base-band transmissions, from the transmitter. In embodiments with a separate base-band transmission, then, cross-channel coupling into the base-band is minimized or eliminated. Further, removing the base-band harmonics from the transmitted signals simplifies cross-channel cancellation at receiver 220-$p$. In embodiments where high pass filter 215 exists, most of the base-band contribution from each of up-converting modulators 212-1 through 212-K, $$\sum_{k=1}^{K}(\xi_k^0 I_k^{LPF}(t) - \zeta_k^0 Q_k^{LPF}(t)),$$

is filtered out and becomes close to 0. The output signal from transmitter 210-$p$ then becomes $$z'(t) = y_0(t) + \sum_{M=1}^{\infty}\sum_{\forall k,n\in k^* n=M}(\xi_k^n I_k^{LPF}(t)\cos M\omega_0 t - \zeta_k^n Q_k^{LPF}(t)\sin M\omega_0 t). \qquad (4)$$

In many embodiments the frequencies $f_1$ through $f_K$ are chosen as multiplies of a single frequency $f_0$ which can fulfill equations 3 and/or 4 and results in the harmonic mixing of channels as shown in equation 3 and 4. In embodiments that do not utilize a set of frequencies which are multiples of a single frequency, $f_0$, cross-channel interference is immensely more difficult to cancel.

In some embodiments of the invention, DACs 406 and 407 of the embodiment of up-converting modulator 212-$k$ shown in FIG. 4B may be moved to receive the output of summer 412. Further, in some embodiments DACs 406 and 407 can be replaced by a single DAC to receive the output of summer 213. However, such DACs should have very high sampling rates. One advantage of utilizing high-sampling rate DACs is that ideal mixing could take place and the number of harmonics that need to be cancelled can be greatly reduced or even eliminated.

In some embodiments, DACs 406 and 407 of each of up-converting modulators 212-1 through 212-K can each be 4 bit DACs. The above described trellis encoder 402, in this embodiment, provides an asymptotic coding gain of about 6 dB over uncoded 128-QAM modulation with the same data rate, see, e.g., G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February 1987, pp. 12-21.

As an example, then, embodiments of transmitter 210-$p$ capable of 10 Gbps transmission can be formed. In that case, $\eta=10$, i.e., an overall throughput of 10 Gbps from the transmitter to the receiver. Some embodiments, for example, can have (K+1)=8 channels 301-0 through 301-7. Channels 301-1 through 301-7 can be 6/7 trellis encoded 128 QAM with the baud rate on each channel $B_k$ being 1.25 GHz/6 or about 208.333 Msymbols/sec. Channel 301-0, the base-band channel, can be PAM-8 with no error correction coding (i.e., uncoded PAM-8) with baud rate $B_0$ being 416.667 Msymbols/sec. In other words, $n_k=6$; $1\leq k\leq 7$ and encoder 402 is a 6/7 rate trellis encoder. In this example, channels 301-1 through 301-7 can be transmitted at frequencies $2f_0$, $3f_0$, $4f_0$, $5f_0$, $6f_0$, $7f_0$ and $8f_0$, respectively, where $f_0$ can be, for example, $1.5*B_k$ or 312.5 MHz.

Figure 2E:
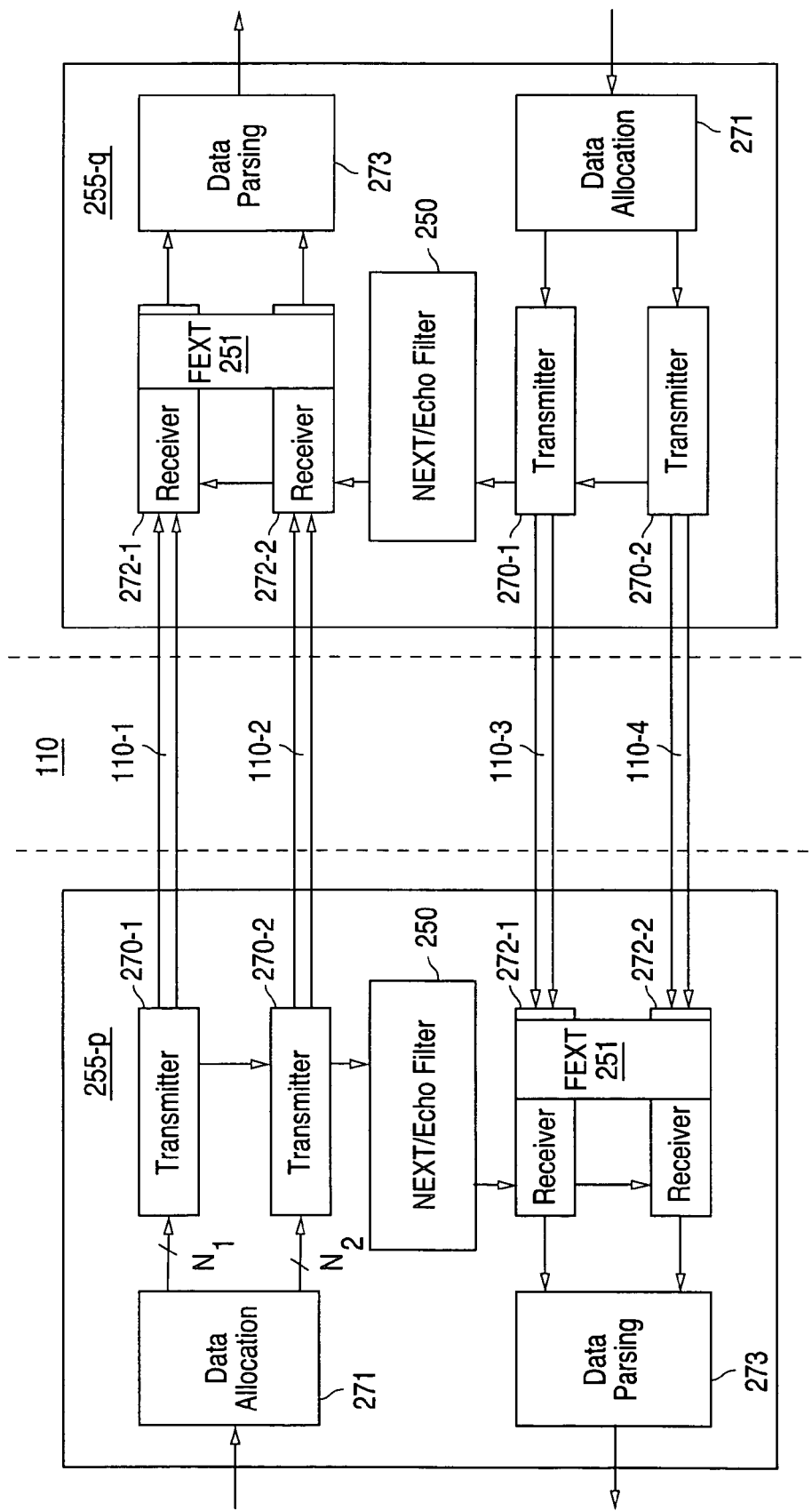
FIG. 2E shows a block diagram of an embodiment of a transceiver pair configuration according to the present invention.

In some embodiments of the invention, as shown in FIG. 2E, embodiments of transceiver 255-$p$ include two receivers (i.e., receivers 272-1 and 272-2) and two transmitters (i.e., transmitters 270-1 and 270-2). Transceiver 255-$p$ is coupled to a complementary transceiver 255-$q$ through, for example, four pairs of category 5, 5E or 6 cabling, as shown in transmission medium 110 as media 110-1, 110-2, 110-3 and 110-4 in FIG. 2E. As shown in FIG. 2E, transceiver 255-$q$ also includes two receivers (i.e., receivers 272-1 and 272-2) and two transmitters (i.e. 270-1 and 270-2) complementarily coupled to transceiver 255-$p$, i.e. transmitter 270-1 of transceiver 255-$p$ is coupled through media 110-1 to receiver 272-1 of transceiver 255-$q$; transmitter 270-2 of transceiver 255-$p$ is coupled through media 110-2 to receiver 272-2 of transceiver 255-$q$; receiver 272-1 of transceiver 255-$p$ is coupled through media 110-3 to transmitter 270-1 of transceiver 255-*q*; and receiver 272-2 of transceiver 255-*p* is coupled through media 110-4 to transmitter 270-2 of transceiver 255-*q*.

In some embodiments as shown in FIG. 2E, each of transmitters 270-1 and 270-2 of transceiver 255-*p* and transmitters 270-1 and 270-2 of transceiver 255-*q* transmits utilizing four (4) channels with frequencies $f_0$, $2f_0$, $3f_0$ and $4f_0$, where $f_0$ is about 312.5 MHz (a factor of 1.5 times the baud rate) and a baud rate of 208.333 Msymbols/sec. The embodiments of transceivers 255-*p* and 255-*q* can utilize QAM128 symbols with the 6/7 trellis code. The resulting system can transmit a total of 10 Gbits/sec in each direction between transceiver 255-*p* and 255-*q*.

Figure 2F:
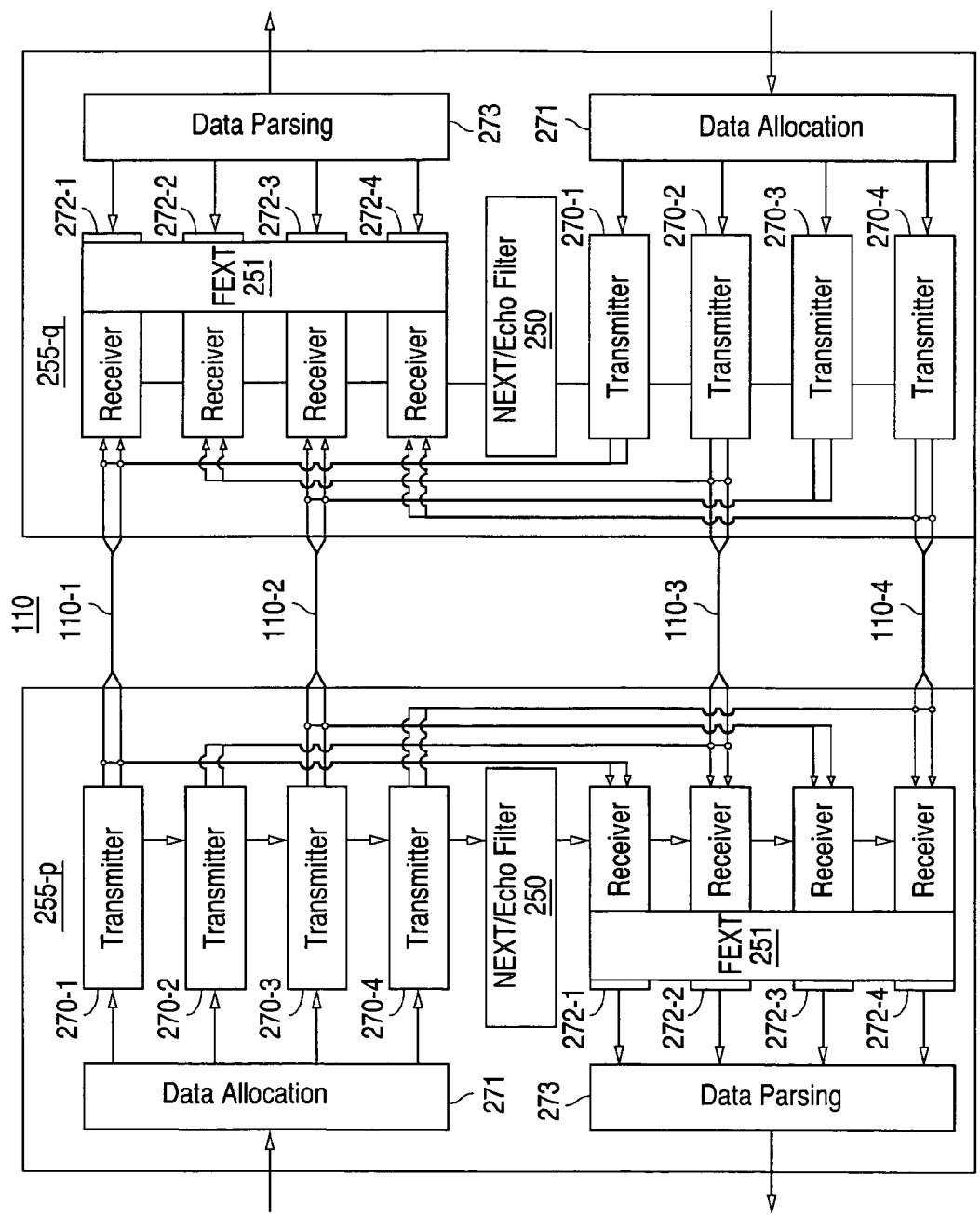
FIG. 2F shows a block diagram of another embodiment of a transceiver pair configuration according to the present invention.

FIG. 2F shows another embodiment of communicating complementary transceivers 255-*p* and 255-*q*. In the embodiment shown in FIG. 2F, transceiver 255-*p* includes four (4) transmitters 270-1 through 270-4 and four (4) receivers 272-1 through 272-4. Complementary transceiver 255-*q* also includes four (4) transmitters 270-1 through 270-4 and four (4) receivers 272-1 through 272-4. Transmitters 270-1 through 270-4 of transceiver 255-*p* are coupled to receivers 272-1 through 272-4 of transceiver 255-*q* through four (4) media 110-1 through 110-4 of transmission medium 110. Conversely, transmitters 270-1 through 270-4 of transceiver 255-*q* are coupled to receivers 272-1 through 272-4 of transceiver 255-*p* through the same four (4) media 110-1 through 110-4. Each of media 110-1 through 110-4 carries full-duplex data, i.e. data flows both directions. Therefore, transmitter 270-1 of transceiver 255-*p* is coupled to receiver 272-1 of transceiver 255-*q* and receiver 272-1 of transceiver 255-*p* is coupled to transmitter 270-1 of transceiver 255-*q* through media 110-1; transmitter 270-2 of transceiver 255-*p* is coupled to receiver 272-2 of transceiver 255-*q* and receiver 272-2 of transceiver 255-*p* is coupled to transmitter 270-2 of transceiver 255-*q* through media 110-2; transmitter 270-3 of transceiver 255-*p* is coupled to receiver 272-3 of transceiver 255-*q* and receiver 272-3 of transceiver 255-*p* is coupled to transmitter 270-3 of transceiver 255-*q* through media 110-3; transmitter 270-4 of transceiver 255-*p* is coupled to receiver 272-4 of transceiver 255-*q* and receiver 272-4 of transceiver 255-*p* is coupled to transmitter 270-4 of transceiver 255-*q* through media 110-4.

Media 110-1 through 110-4 can be, for example, category 5, 5E or 6 copper pairs. Each of transmitters 270-1 through 270-4 of transceiver 255-*p* and transmitters 270-1 through 270-4 of transceiver 255-*q* includes two channels with a baud rate of 208.333 Msymbols/sec each. Again, $f_0$ can be 312.5 MHz, or 1.5 times the baud rate. Again, a QAM128 symbol set may be utilized with 6/7 trellis encoding. The resulting total transmission rate is 10 Gbits/sec in each direction.

In some embodiments of the configuration shown in FIG. 2F, transmitters 270-1 through 270-4 of transceiver 255-*p* and the complementary receivers 272-1 through 272-4 of transceiver 255-*q* operate with channels at different frequencies than transmitters 270-1 through 270-4 of transceiver 255-*q* and the complementary receivers 272-1 through 272-4 of transceiver 255-*p*. For example, transmitters 270-1 through 270-4 of transceiver 255-*p* may each transmit on channels with carrier frequencies $f_0$ and $3f_0$ while transmitters 270-1 through 270-4 of transceiver 255-*q* transmit on channels with carrier frequencies $2f_0$ and $4f_0$. However, in some embodiments of the invention, transmitters 270-1 and 270-2 of transceiver 255-*p* and transmitters 270-1 and 270-2 of transceiver 255-*q* transmit using the same set of frequencies, $f_0$ and $2f_0$.

In another example embodiment, 10 Gbps ($\eta$=10) can utilize (K+1)=2 channels 301-0 and 301-1. Channel 301-1 can be, for example, 16 QAM with no error correction coding (i.e., uncoded 16-QAM) with baud rate $B_1$ of 1.25 GHz and channel 301-0 can be, for example, 16-PAM with no error correction coding (i.e., uncoded 16-PAM) with baud rate $B_0$ at 1.25 GHz. The baud rate for both the PAM channel and the QAM channel is then 1.25 Gsps. The throughput is 5 Gbps each for a total transmission rate of 10 Gbps. With an excess bandwidth of the channels of about 50%, the center frequency of the QAM channel can be $f_1 \geq (1.5) * 1.25$ GHz or above about 1.8 GHz.

In another example embodiment, 10 Gbps can utilize (K+1)=2 channels 301-0 and 301-1 as in the previous example with channel 301-1 being a 4/5 trellis encoded 32 QAM with a baud rate $B_1$ of 1.25 GHz with channel 301-0 being uncoded 16-PAM with baud rate $B_o$ of 1.25 GHz. Again, the center frequency of channel 301-1 can be $f_1 \geq (1.5) * 1.25$ GHz or above about 1.8 GHz.

In yet another example, (K+1)=6 channels, channels 301-0 through 301-5, can be utilized. Channels 301-1 through 301-5 can be 6/7 trellis encoded 128-QAM with baud rate $B_k$ of 1.25 GHz/6 or 208 MHz. Channel 301-0, the base-band channel, can be 3/4 encoded 16 PAM or uncoded 8-PAM with baud rate $B_0$=1.25 GHz. The center frequencies of channels 301-1 through 301-5 can be $4f_0$, $5f_0$, $6f_0$, $7f_0$, and $8f_0$, respectively, with $f_0$ being about 312.5 MHz.

Although several different embodiments are specifically described here, one skilled in the art will recognize that many other configurations of transceivers according to the present invention are possible. One can arrange the number of transmitters and complementary receivers and the number of channels per transmitter in any way, depending on the desired baud rate and transceiver complexity. It is recognized that a given desired buad rate can be achieved by providing transceivers with a small number of transmitters transmitting on a large number of channels or a larger number of transmitters on a smaller number of channels. Further, data can be transmitted in half-duplex or full-duplex mode over the transmission medium. Again, the filtering demands will be different for half-duplex or full-duplex transmission. For example, Echo filtering should be included in full-duplex transmission, but may not be useful in half-duplex transmission.

As shown in FIGS. 2B and 2C, signals from base-band modulator 217 and each of up-converting modulators 212-1 through 212-K of each of transmitters 270-1 through 270-T are input to NEXT/Echo filter 250. In the embodiments shown in FIGS. 4A and 4B, the output signals from symbol mappers 456 and 403, respectively, are input to NEXT/Echo filter 250. Other embodiments of the invention may utilize other signals from base-band modulator 217 and up-converting modulators 212-1 through 212-K in order to correct for near-end cross talk and echo.

Figure 5A:
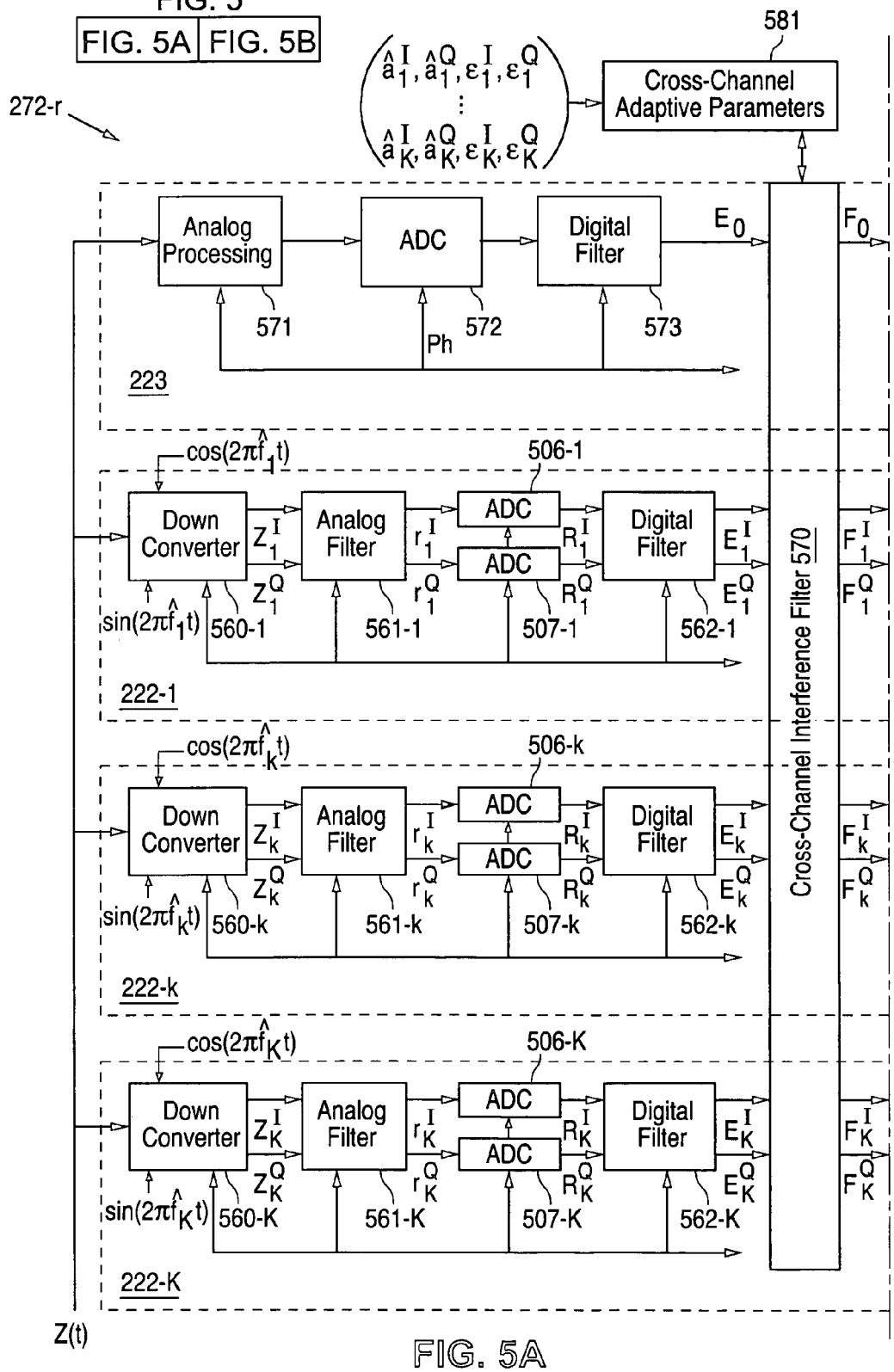
FIG. 5 shows a block diagram of an embodiment of a receiver according to the present invention.
Figure 5B:
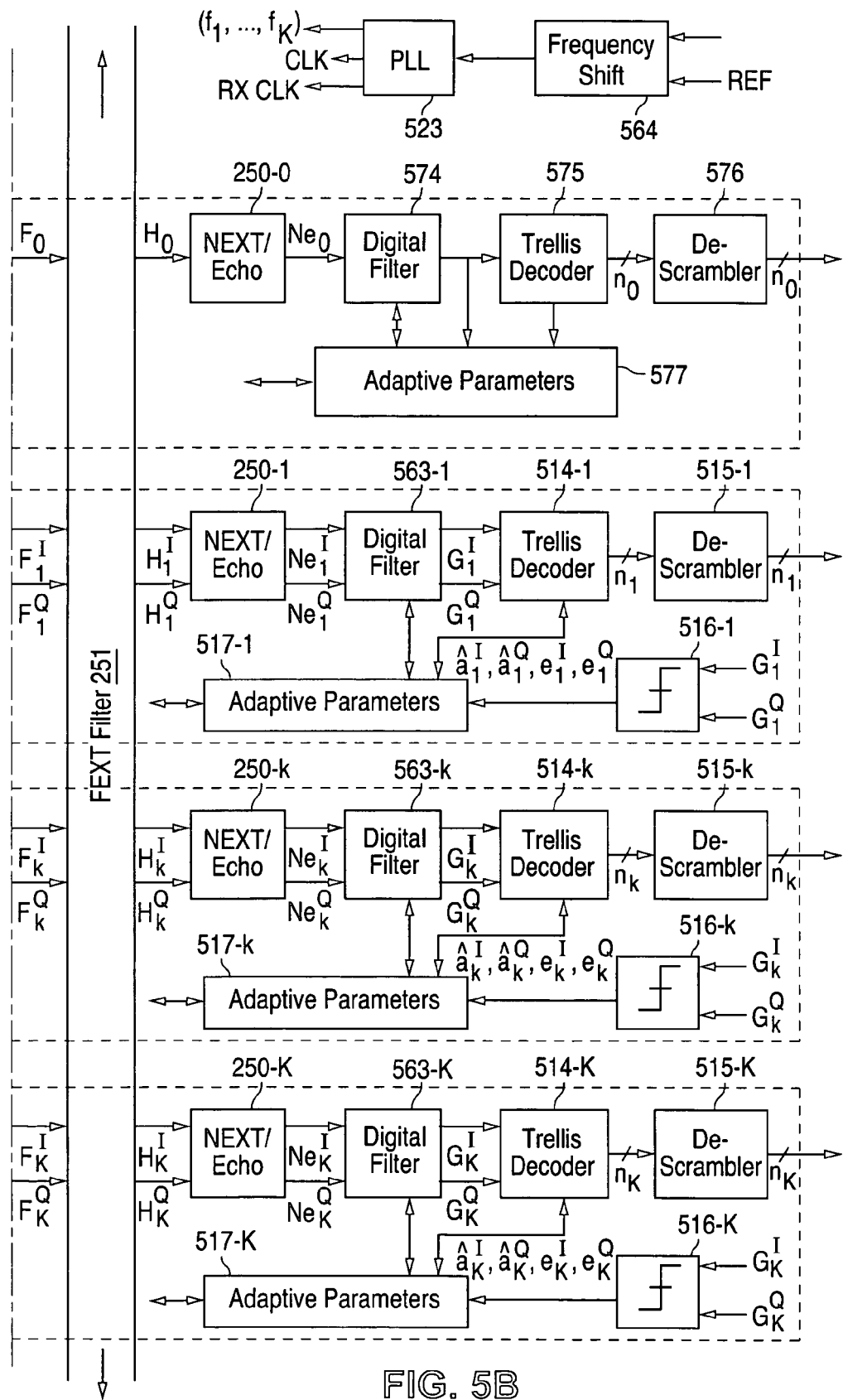

FIG. 5 shows a block diagram of an embodiment of receiver 272-*r* (see FIGS. 2B and 2D). Receiver 272-*r* is included in receiver portion 220-*p* of transceiver 255-*p* and therefore is adjacent to transmitters 270-1 through 270-T of transmitter portion 210-*p* of transceiver 255-*p*, as shown in FIG. 2B, which results in near-end cross talk interference (NEXT). Furthermore, receiver 272-*r* receives data from a complementary transmitter over transmission medium 110. The complementary transmitter is adjacent to other transmitters, which results in far-end cross talk interference (FEXT). Further, if transmission medium 110 is full duplex, then one of transmitters 270-1 through 270-T transmits over the same medium on which receiver 272-*r* receives, which results in Echo interference. Additional interference results from the cross-channel interference discussed above and the inter-symbol interference due to transmission medium 110 itself.

As shown in FIG. 2D, receiver 272-r of receiver portion 220-p includes demodulators 221-1 through 221-K and possibly base-band demodulator 223 to form a (K+1)-channel receiver. Some embodiments do not include base-band demodulator 223. The output signals from receiver input buffer 224, Z(t), are received in each of down-converting demodulators 222-1 through 222-K and base-band demodulator 223 of receiver 272-r. The signal Z(t), then, is the transmitted signal z(t) from the complementary transmitter after transmission through transmission medium 110. As shown in FIG. 3, the attenuation of signals at each of the K carrier frequencies utilized by transmitter 272-r after transmission through medium 110 can be different. Additionally, the signal Z(t) suffers from inter-symbol interference caused by the dispersive effects of medium 110.

The dispersive effects cause the signals received within a particular timing cycle to be mixed with those signals at that carrier frequency received at previous and future timing cycles. Therefore, in addition to cross-channel interference effects caused by the harmonic generation in mixers of the complementary transmitter (which is a transmitter of one of transmitter portions 210-1 through 210-P), but also the signals for each channel are temporally mixed through dispersion effects in medium 110. Also, the signal received at input buffer 224 includes near-end cross talk and echo interference from transmitters 270-1 through 270-T of transmitter portion 210-p of transceiver 255-p (see FIG. 2B). Further, FEXT interference results from the interference from the other transmitters at the far end (i.e., the complementary transceiver) communicating with receiver 272-1 thorough 272-R. Therefore, the input signal Z(t) at input buffer 224 includes the signal transmitted by the complementary transmitter a contribution from the output signals transmitted by transmitters 270-1 through 270-T and a signal transmitted by other transmitters at the complementary transceiver.

FIG. 5 shows embodiments of base-band demodulator 223 and down-converting demodulators 222-1 through 222-K of transmitter 272-r. Signal Z(t) is received into each of base-band demodulator 223 and down-converting demodulators 222-1 through 222-K. As shown in FIG. 5, down-converting demodulator 222-k, an arbitrary one of down-converting demodulators 222-1 through 222-K, for example, receives the signal Z(t) into down converter 560-k which down converts the channel transmitted at frequency $f_k$ back into the baseband and recovers in-phase and quadrature components $Z_k^I(t)$ and $Z_k^Q(t)$, respectively.

Down converter 560-k down converts the signal from Z(t) by a frequency $\hat{f}_k$, where $\hat{f}_k$ can be the locally generated estimate of the carrier center frequency $f_k$ from the complementary transmitter. The clock signals within component 201-p, an arbitrary one of components 201-1 through 201-P, which are generated based on the reference signal from PLL 230 as shown in FIG. 2A, will have the same frequencies. However, the frequencies between differing ones of components 201-1 through 201-P can be slightly different. Therefore, $\{f_k\}$ denotes the set of frequencies at the complementary transmitter and $\{\hat{f}_k\}$ denotes the set of frequencies at receiver 272-r. In some embodiments, the frequencies utilized for each of the channels for transceiver 255-p as a whole are fixed.

As shown in FIG. 5, PLL 523 generates the clock signals for each of down-converting demodulators 222-1 through 222-K and base-band demodulator 223 and, in particular, generates the $\sin(2\pi \hat{f}_k t)$ signal for down-converting demodulator 222-k. The $\cos(2\pi \hat{f}_k t)$ signal can be generated by the $\pi/2$ phase shifter in PLL 523. PLL 523 generates the sampling clock signal utilized in analog to digital converters (ADCs) 506-k and 507-k as well as other timing signals utilized in down-converting demodulators 222-1 through 222-K and base-band demodulator 223. PLL 523 also generates an RX CLK signal for output with the $n_k$ bit output signal from down-converting demodulator 222-k of receiver 272-r.

PLL 523 can be a free-running clock for receiver 272-r based on a reference clock signal. In some embodiments the complementary transmitter of receiver 272-r of the receiver system 220-p, because they are part of different ones of components 201-1 through 201-P, are at different clock signals. This means that the PLLs for timing recovery and carrier recovery correct both phase and frequency offsets between the transmitter clock signals and receiver clock signals. Within one of components 201-1 through 201-P, each of the individual transmitters and receivers can operate with the same PLL and therefore will operate with the same clock signals. Components 201-i and 201-j, where i and j refer to different ones of components 201-1 through 201-P, in general may operate at different clock signal frequencies.

In some embodiments, transceiver 255-p communicates with only one complementary transceiver 255-q, for example as shown in FIGS. 2E and 2F. In such arrangements, transceiver 255-p can include a master clock that controls the overall frequency of both transceiver 255-p and 255-q. In this arrangement, the clock of transceiver 255-p has a free-running frequency based on a reference clock. Transceiver 255-q is then slaved to the timing of transceiver 255-p. In other words, PLL 523 and frequency shift 564 of transceiver 255-q are utilized to recover the frequency of transceiver 255-p. Since the harmonic frequencies and baud rate frequencies are functions of each other, recovery of one frequency for one channel can lead to correct frequencies for all the mixers and the baseband/baud rate of transceiver 255-q. Not only will the slave use the recovered frequency to receive in its mixer and ADC and baseband circuitry, it will also use this frequency in the transmit mixer and the baseband transmit. This way, the master transceiver will automatically have the correct frequency using its original clock. By having the entire system (baseband and mixers) run from one base frequency, the complexity of the filters such as Next/Echo filter 250, FEXT filter 251, or cross-channel interference filter 570 can be as described below. Embodiments of the invention where the entire system does not operate from one base frequency, the complexity of Next/Echo filter 250, FEXT filter 250, and cross-channel interference filter 570 is much increased.

In more complex systems where transceiver 255-p may transmit to complementary receivers in more than one other transceiver and where transceiver 255-p may receive from complementary transmitters in more than one other transceiver, a master/slave arrangement may also be arranged. The transmitted signals from each of transmitters 270-1 through 270-T of transceiver 255-p may be utilized in each transceiver having a complementary receiver (i.e., a receiver that receives data from one of transmitters 270-1 through 270-T of transceiver 255-p) to set its internal frequency. The internal operating frequency for transceivers that do not receive data from transceiver 255-p (i.e., ones that do not include a complementary transceiver) can be slaved to the frequencies transmitted by complementary transceivers that are slaved to transceiver 255-$p$. In that fashion, each of transceivers 255-1 through 255-P can effectively be slaved to one transceiver 255-$p$.

Down converters 560-1 through 560-K also generate harmonics for very much the same reasons that harmonics are generated in up-converting modulators 212-1 through 212-K. Therefore, down converter 560-$k$ will down-convert into the base-band signals from signals having center frequencies 0, $f_k$, $2f_k$, $3f_k$, . . . . Additionally, the output signals $Z_2^I(t)$ and $Z_2^Q(t)$ include contributions from channels with frequencies 0, $2f_0$, $4f_0$, $6f_0$ . . . and those channels with harmonics at these frequencies. Therefore, signals from channel k=3 need to be cancelled from signals transmitted on channel k=2. Each of the channels also include the cross-channel interference generated by the transmitter mixers and the dispersive interference created by the channel. If the base-band component of the harmonics is not filtered out by filter 215 (FIG. 2C), then every channel could put a copy of its transmit signal onto the base-band and every channel will receive the base-band signal at the receive side.

The signals $Z_k^I(t)$ and $Z_k^Q(t)$ also will include interference from near-end cross talk and possibly Echo, i.e. interference from transmissions from transmitters 270-1 through 270-T in transmitter portion 210-$p$, and FEXT, i.e. interference from transmissions from transmitters transmitting to receivers 272-1 through 272-R (except signals transmitted to receiver 272-$r$ shown in FIG. 5). Additionally, all of the cross-channel effects in the transmission will manifest in the interference of individual signals in down-converting demodulators 222-1 through 222-K and base-band demodulator 223. Therefore, in some embodiments the signals $Z_k^I(t)$ and $Z_k^Q(t)$ output from down converter 560-$k$ suffer the effects of cross-channel interference resulting from harmonic generation in the transmitter mixers of the complimentary transmitter transmitting to receiver 272-$r$, the effects of cross-channel interference resulting from harmonic generation in the receiver mixers of receiver 272-$r$, the effects of near-end cross talk interference and echo, the effects of far end cross talk, and the effects of temporal, intersymbol interference, resulting from dispersion in the transport media. As an additional complicating factor, in some embodiments the transmitter and receiver clocks of a complimentary communicating transmitter/receiver pair can be different. Therefore, as an example, in embodiments where $f_1$ through $f_K$ of the transmitter correspond to frequencies $f_0$ through $Kf_0$, respectively, then $\tilde{f}_1$ through $\tilde{f}f_K$ of the receiver will correspond to frequencies $(f_0+\Delta)$ through $K(f_0+\Delta)$, where $\Delta$ represents the frequency shift between PLL 523 of receiver 220-$p$ and the PLL of the transmitter component. The transmitter mixers then cause cross-channel interference by mixing the signals transmitted at frequency $f_k$ into $0f_k$, $2f_k$, $3f_k$ . . . (0, $2kf_0$, $3kf_0$ . . . in one example). The receiver mixers cause cross-channel interference by down-converting the signals received at $0f_k$, $f_k$, $2f_k$, $3f_k$ . . . to the base-band. If the frequencies $\tilde{f}_0$ is $f_0+\Delta$, then the harmonics will be down-converted to a base-band shifted in frequency by $k\Delta$, $2k\Delta$, $3k\Delta$, . . . , respectively.

In some embodiments of the invention, receiver 220-$p$ includes a frequency shift 564 which supplies a reference clock signal to PLL 523. The reference clock signal supplied to PLL 523 can be frequency shifted so that $\Delta$ becomes 0. The frequency supplied to PLL 523 by frequency shift 564 can be digitally created and the input parameters to frequency shift 564 can be adaptively chosen to match the receiver frequency with the transmitter frequency. In a master/slave environment, the frequency is adjusted only if receiver 272-$r$ is not part of the master transceiver.

The output signals from down-converter 560-$k$, $Z_k^I(t)$ and $Z_k^Q(t)$, are input to analog filter 561-$k$. In some embodiments, analog filter 561-$k$ can provide offset correction to correct for any leakage onto signal Z(t) from the sine and cosine signals provided by PLL 523, plus any DC offset in filters 504-$k$ and 505-$k$ and ADCs 506-$k$ and 507-$k$. The DC offset values can be adaptively chosen and, in some embodiments, after an initial start-up procedure, the DC offset values can be fixed. Analog filter 561-$k$ can, in some embodiments, provide filtering for filtering out signals in $Z_k^I(t)$ and $Z_k^Q(t)$ that are not associated with signals at the base-band of down-converting demodulator 222-$k$. Additionally, an amplification may be provided in filter 561-$k$. The gains of filter 561-$k$ can be determined by an automatic gain control (AGC). The output signals from analog filter 561-$k$, then, can be $$r_k^I(t) = \text{LPF}[Z(t)\cos(2\pi \tilde{f}_k t)]g_k^{1(I)}$$

$$r_k^Q(t) = \text{LPF}[Z(t)\sin(2\pi \tilde{f}_k t)]g_k^{1(Q)}, \quad (5)$$

where $g_k^{1(I)}$ and $g_k^{1(Q)}$ represents the gains of the amplification and $Z_k^I(t) = Z(t)\cos(2\pi \tilde{f}_k t)$ and $Z_k^Q(t) = Z(t)\sin(2\pi \tilde{f}_k t)$.

The signals output from analog filter 561-$k$, signals $r_k^I(t)$ and $r_k^Q(t)$, are input to analog-to-digital converters (ADC) 506-$k$ and 507-$k$, respectively, which forms digitized signals $R_k^I(v)$ and $R_k^Q(v)$ corresponding with the analog signals $r_k^I(t)$ and $r_k^Q(t)$, respectively. The integer index v indicates the number of clock cycles of the system clock, which is usually operating at the transmission symbol rate. In some embodiments, ADCs 506-$k$ and 507-$k$ operate at a sampling rate that is the same as the transmission symbol rate, e.g. the QAM symbol rate. In some embodiments, ADCs 506-$k$ and 507-$k$ can operate at higher rates, for example twice the QAM symbol rate. The timing clock signal SCLK, as well as the sine and cosine functions of Equation 5, is determined by PLL 523. In outputs with $\eta=10$, K=4, $n_k=6$ and two transmission media, as described above, ADCs 506-$k$ and 507-$k$ can operate at a rate of about 208.333 Msymbols/sec or, in embodiments with K=8 and two transmission media, about 104.167 Msymbols/sec. In some embodiments, ADCs 506-$k$ and 507-$k$ can be 8-bit ADCs. However, for 128 QAM operation, anything more than 7 bits can be utilized. In some embodiments, the gain of amplifiers in analog filters 560-$k$ can be set by automatic gain control circuit (AGC) 520-$k$ based on the digital output signals from ADCs 506-$k$ and 507-$k$, $R_k^I(v)$ and $R_k^Q(v)$, respectively.

The output signals from ADCs 506-$k$ and 507-$k$, $R_k^I(v)$ and $R_k^Q(v)$, respectively, are input to a first digital filter 562-$k$. In some embodiments of the invention, the in-phase and quadrature data paths may suffer from small differences in phase, denoted $\theta_k^c$, and small differences in gain. Therefore, in some embodiments a phase and amplitude correction is included in digital filter 562-$k$. In order to correct the phase and amplitude between the in-phase and quadrature data paths, one of the values $R_k^I(v)$ and $R_k^Q(v)$ is assumed to be of the correct phase and amplitude. The opposite value is then corrected. The phase error can be corrected by using the approximation for small $\theta_k^c$ where $\sin \theta_k^c$ is approximately $\theta_k^c$, and $\cos \theta_k^c$ is approximately one. As an example, assume that the value for $R_k^I(v)$ is correct, the value for $R_k^Q(v)$ is then corrected. This correction can be implemented by subtracting the value $\theta_k^c R_k^I(V)$ from $R_k^Q(v)$, for example. The amplitude of $R_k^Q(v)$ can also be corrected by adding a small portion $\eta_k^c$ of $R_k^Q(v)$. The values $\eta_k^c$ and $\theta_k^c$ can be adaptively determined in adaptive parameters block 517-$k$. Additionally, an arithmetic offset can be implemented by subtracting an offset value from each of $R_k^I(v)$ and $R_k^Q(v)$. The offset values can also be adaptively chosen in adaptive parameter block 517-$k$.

Further, a phase rotation circuit can also be implemented in first digital filter 562-$k$. The phase rotation circuit rotates both the in-phase and quadrature signals by an angle $\hat{\theta}_k^1$. The angle $\hat{\theta}_k^1$ can be adaptively chosen. In some embodiments, the phase rotation circuit can be implemented before the angle and amplitude correction circuits.

Finally, a digital equalizer can also be implemented in digital filter 562-$k$. Digital filter 562-$k$ can be any combination of linear and decision feed-back equalizers, the coefficients of which can be adaptively chosen.

In the embodiment of the invention shown in FIG. 5, the complex adaptive equalizer included in digital filter 562-$k$ can counter the intersymbol interference caused by frequency dependent channel attenuation, and the reflections due to connectors and vias that exist in communication system 200 (which can be a backplane communication system, an inter-cabinet communication system, or a chip-to-chip communication system) and both transmit and receive low pass filters. It should be noted that because of the frequency division multiplexing of data signals, as is accomplished in transmitter system 210-$p$ and receiver system 220-$p$, the amount of equalization needed in any one of channels 301-0 through 301-K is minimal. In some embodiments, such as the 16-channel, 6 bit per channel, 10 Gbps example, only about 1-2 dB of transmission channel magnitude distortion needs to be equalized. In 8 channel embodiments, 3-4 dB of distortion needs to be equalized. In other words, the number of taps required in a transport function for the equalizer can be minimal (e.g., 1-4 complex taps) in some embodiments of the present invention, which can simplify receiver 220-$p$ considerably. In some embodiments of the invention, the equalizer can have any number of taps. In some embodiments, NEXT/Echo filter 250 may be implemented before cross-channel interference filter 570 and FEXT filter 251.

As shown in FIG. 5, cross-channel interference canceller 570 removes the effects of cross-channel interference from signals $E_1^I(v)$ and $E_1^Q(v)$ through $E_K^I(v)$ and $E_K^Q(v)$ output from digital filters 562-1 through 562-K. Cross-channel interference can result, for example, from harmonic generation in the transmitter and receiver mixers, as has been previously discussed. In some embodiments of the invention, cross-channel interference filter 570 may be placed before the equalizer of digital filter 562-$k$.

The output signals from digital filter 562-2, $E_k^I(v)$ and $E_k^Q(v)$, for each of down-converting demodulators 222-1 through 222-K are input to cross-channel interference filter 570. For convenience of discussion, the input signals $E_k^I(v)$ and $E_k^Q(v)$ are combined into a complex value $E_k(v)=E_k^I(v)+iE_k^Q(v)$ (where $i$ is $\sqrt{-1}$). A sum of contributions from each of the channels (i.e., each of signals $E_1(v)$ through $E_{k-1}(v)$, $E_{k+1}(v)$ through $E_K(V)$ and, in some embodiments, $E_0(v)$), are subtracted from the value of $E_k(v)$ for each channel. The complex value $F_k(v)$ is $F_k^I(v)+iF_k^Q(v)$, representing the in-phase and quadrature output signals, with $F_0(v)$ representing the real value of the base-band demodulator 223, are output from cross-channel interference filter 570. The output signals $F_{I,r}$ through $F_{K,r}$ can be determined by $$\begin{pmatrix} F_{1,r}^I \\ F_{2,r}^I \\ \vdots \\ F_{k,r}^I \\ \vdots \\ F_{K,r}^I \end{pmatrix} = \begin{pmatrix} Z^{-N} & 0 & \cdots & 0 & \cdots & 0 \\ 0 & Z^{-N} & \cdots & 0 & \cdots & 0 \\ \vdots & \vdots & \ddots & \vdots & \cdots & \vdots \\ 0 & 0 & \cdots & Z^{-N} & \cdots & 0 \\ \vdots & \vdots & \cdots & \vdots & \ddots & \vdots \\ 0 & 0 & \cdots & 0 & \cdots & Z^{-N} \end{pmatrix} \begin{pmatrix} E_{1,r}^I \\ E_{2,r}^I \\ \vdots \\ E_{k,r}^I \\ \vdots \\ E_{K,r}^I \end{pmatrix} - \quad (6)$$

$$RE\left[ \begin{pmatrix} 0 & Q_{2,1}^{I,r} & \cdots & Q_{k,1}^{I,r} & \cdots & Q_{K,1}^{I,r} \\ Q_{1,2}^{I,r} & 0 & \cdots & Q_{k,2}^{I,r} & \cdots & Q_{K,2}^{I,r} \\ \vdots & \vdots & \ddots & \vdots & \vdots & \vdots \\ Q_{1,k}^{I,r} & Q_{2,k}^{I,r} & \cdots & 0 & \cdots & Q_{K,k}^{I,r} \\ \vdots & \vdots & \cdots & \vdots & \ddots & \vdots \\ Q_{1,K}^{I,r} & Q_{2,K}^{I,r} & \cdots & Q_{k,K}^{I,r} & \cdots & 0 \end{pmatrix} \begin{pmatrix} E_{1,r} \\ E_{2,r} \\ \vdots \\ E_{k,r} \\ \vdots \\ E_{K,r} \end{pmatrix} \right] \begin{pmatrix} F_{1,r}^Q \\ F_{2,r}^Q \\ \vdots \\ F_{k,r}^Q \\ \vdots \\ F_{K,r}^Q \end{pmatrix} =$$

$$\begin{pmatrix} Z^{-N} & 0 & \cdots & 0 & \cdots & 0 \\ 0 & Z^{-N} & \cdots & 0 & \cdots & 0 \\ \vdots & \vdots & \ddots & \vdots & \cdots & \vdots \\ 0 & 0 & \cdots & Z^{-N} & \cdots & 0 \\ \vdots & \vdots & \cdots & \vdots & \ddots & \vdots \\ 0 & 0 & \cdots & 0 & \cdots & Z^{-N} \end{pmatrix} \begin{pmatrix} E_{1,r}^Q \\ E_{2,r}^Q \\ \vdots \\ E_{k,r}^Q \\ \vdots \\ E_{K,r}^Q \end{pmatrix} -$$

$$IM\left[ \begin{pmatrix} 0 & Q_{2,1}^{Q,r} & \cdots & Q_{k,1}^{Q,r} & \cdots & Q_{K,1}^{Q,r} \\ Q_{1,2}^{Q,r} & 0 & \cdots & Q_{k,2}^{Q,r} & \cdots & Q_{K,2}^{Q,r} \\ \vdots & \vdots & \ddots & \vdots & \vdots & \vdots \\ Q_{1,k}^{Q,r} & Q_{2,k}^{Q,r} & \cdots & 0 & \cdots & Q_{K,k}^{Q,r} \\ \vdots & \vdots & \cdots & \vdots & \ddots & \vdots \\ Q_{1,K}^{Q,r} & Q_{2,K}^{Q,r} & \cdots & Q_{k,K}^{Q,r} & \cdots & 0 \end{pmatrix} \begin{pmatrix} E_{1,r} \\ E_{2,r} \\ \vdots \\ E_{k,r} \\ \vdots \\ E_{K,r} \end{pmatrix} \right]$$

where $Z^{-1}$ represents a once cycle delay and the additional designation r indicates the receiver 272-$r$. For convenience, the time index v has been omitted. The subscript r has been added to index to receiver 272-$r$. In some embodiments, cross channel interference into the baseband is also included, in which case the $F_{0,r}$ and $E_{0,r}$ and transfer functions describing contributions in the base-band and caused by the base-band channel are also included in Equation 6, otherwise all of $Q_{k,0}{}^r$ and $Q_{0,k}{}^r$, where $Q_{k,1}{}^r=(Q_{k,1}{}^{I,r}, Q_{k,1}{}^{Q,r})$, will be zero.

The transfer function $Q_{k,l}{}^r$ can have any number of taps and, in general, can be given by $$Q_{k,l}^{I,r} = \sigma_{k,l}^{0,I,r} + \sigma_{k,l}^{1,I,r} Z^{-1} + \sigma_{k,l}^{2,I,r} Z^{-2} + \ldots + \sigma_{k,l}^{M,I,r} Z^{-M};$$

$$Q_{k,l}^{Q,r} = \sigma_{k,l}^{0,Q,r} + \sigma_{k,l}^{1,Q,r} Z^{-1} + \sigma_{k,l}^{2,Q,r} Z^{-2} + \ldots + \sigma_{k,l}^{M,Q,r} Z^{-M}. \quad (7)$$

In general, each of the functions $Q_{k,l}^r$ can have a different number of taps M. The delay time is determined by N and can also be different for each channel. In some embodiments, the number of taps M for each function $Q_{k,l}^r$ can be the same. In some embodiments, delays can be added in order to match the timing between all of the channels. In some embodiments, functions $Q_{k,l}^r$ can include any number of delays.

The coefficients $\sigma_{k,l}^{0,I,r}$ through $\sigma_{k,l}^{M,I,r}$ and $\sigma_{k,l}^{0,Q,r}$ through $\sigma_{k,l}^{M,Q,r}$ can be adaptively chosen in cross-channel adaptive parameter block 581 as shown in FIG. 5 in order to optimize the performance of receiver system 220-$p$. In some embodiments, M is chosen to be 5. In some embodiments, transfer function $Q_{k,l}^r$ may be just 2 complex numbers, when M=0. Further discussion of cross channel interference canceller 570 and the adaptively chosen coefficients can be found in U.S. application Ser. No. 10/310,255, filed on Dec. 4, 2002, which is incorporated by reference into this application in its entirety.

Therefore, in cross channel interference canceller 570 the cross channel interference is subtracted from the output signals from digital filters 562-1 through 562-K. The output signals from cross-channel interference filter 570, $F_{0,r}$ through $F_{K,r}$, are input to FEXT filter 251. FEXT filter 251 corrects for the interference caused by transmitters adjacent to the transmitter coupled to receiver 272-$r$. In embodiments where the adjacent transmitters are coupled to receivers adjacent to receiver 272-$r$, i.e. others of receivers 272-1 through 272-R of transceiver 255-$p$, then the FEXT correction can be given by $$\begin{pmatrix} H_{1,r}^I \\ H_{2,r}^I \\ \vdots \\ H_{k,r}^I \\ \vdots \\ H_{K,r}^I \end{pmatrix} = \begin{pmatrix} Z^{-N} & 0 & \cdots & 0 & \cdots & 0 \\ 0 & Z^{-N} & \cdots & 0 & \cdots & 0 \\ \vdots & \vdots & \ddots & \vdots & \cdots & \vdots \\ 0 & 0 & \cdots & Z^{-N} & \cdots & 0 \\ \vdots & \vdots & \cdots & \vdots & \ddots & \vdots \\ 0 & 0 & \cdots & 0 & \cdots & Z^{-N} \end{pmatrix} \begin{pmatrix} F_{1,r}^I \\ F_{2,r}^I \\ \vdots \\ F_{k,r}^I \\ \vdots \\ F_{K,r}^I \end{pmatrix} - \tag{8}$$

$$\sum_{i=1}^{R} RE \left[ \begin{pmatrix} Fe_{1,1}^{I,i,r} & Fe_{2,1}^{I,i,r} & \cdots & Fe_{k,1}^{I,i,r} & \cdots & Fe_{K_i,1}^{I,i,r} \\ Fe_{1,2}^{I,i,r} & Fe_{2,2}^{I,i,r} & \cdots & Fe_{k,2}^{I,i,r} & \cdots & Fe_{K_i,2}^{I,i,r} \\ \vdots & \vdots & \ddots & \vdots & \vdots & \vdots \\ Fe_{1,k}^{I,i,r} & Fe_{2,k}^{I,i,r} & \cdots & Fe_{k,k}^{I,i,r} & \cdots & Fe_{K_i,k}^{I,i,r} \\ \vdots & \vdots & \cdots & \vdots & \ddots & \vdots \\ Fe_{1,K_r}^{I,i,r} & Fe_{2,K_r}^{I,i,r} & \cdots & Fe_{k,K_r}^{I,i,r} & \cdots & Fe_{K_i,K_r}^{I,i,r} \end{pmatrix} \begin{pmatrix} F_{1,i} \\ F_{2,i} \\ \vdots \\ F_{k,i} \\ \vdots \\ F_{K_i,i} \end{pmatrix} \right]$$

$$\begin{pmatrix} H_{1,r}^Q \\ H_{2,r}^Q \\ \vdots \\ H_{k,r}^Q \\ \vdots \\ H_{K,r}^Q \end{pmatrix} = \begin{pmatrix} Z^{-N} & 0 & \cdots & 0 & \cdots & 0 \\ 0 & Z^{-N} & \cdots & 0 & \cdots & 0 \\ \vdots & \vdots & \ddots & \vdots & \cdots & \vdots \\ 0 & 0 & \cdots & Z^{-N} & \cdots & 0 \\ \vdots & \vdots & \cdots & \vdots & \ddots & \vdots \\ 0 & 0 & \cdots & 0 & \cdots & Z^{-N} \end{pmatrix} \begin{pmatrix} F_{1,r}^Q \\ F_{2,r}^Q \\ \vdots \\ F_{k,r}^Q \\ \vdots \\ F_{K,r}^Q \end{pmatrix} -$$

$$\sum_{i=1}^{R} IM \left[ \begin{pmatrix} Fe_{1,1}^{Q,i,r} & Fe_{2,1}^{Q,i,r} & \cdots & Fe_{k,1}^{Q,i,r} & \cdots & Fe_{K_i,1}^{Q,i,r} \\ Fe_{1,2}^{Q,i,r} & Fe_{2,2}^{Q,i,r} & \cdots & Fe_{k,2}^{Q,i,r} & \cdots & Fe_{K_i,2}^{Q,i,r} \\ \vdots & \vdots & \ddots & \vdots & \vdots & \vdots \\ Fe_{1,k}^{Q,i,r} & Fe_{2,k}^{Q,i,r} & \cdots & Fe_{k,k}^{Q,i,r} & \cdots & Fe_{K_i,k}^{Q,i,r} \\ \vdots & \vdots & \cdots & \vdots & \ddots & \vdots \\ Fe_{1,K_r}^{Q,i,r} & Fe_{2,K_r}^{Q,i,r} & \cdots & Fe_{k,K_r}^{Q,i,r} & \cdots & Fe_{K_i,K_r}^{Q,i,r} \end{pmatrix} \begin{pmatrix} F_{1,i} \\ F_{2,i} \\ \vdots \\ F_{k,i} \\ \vdots \\ F_{K_i,i} \end{pmatrix} \right]$$

Figure 7:
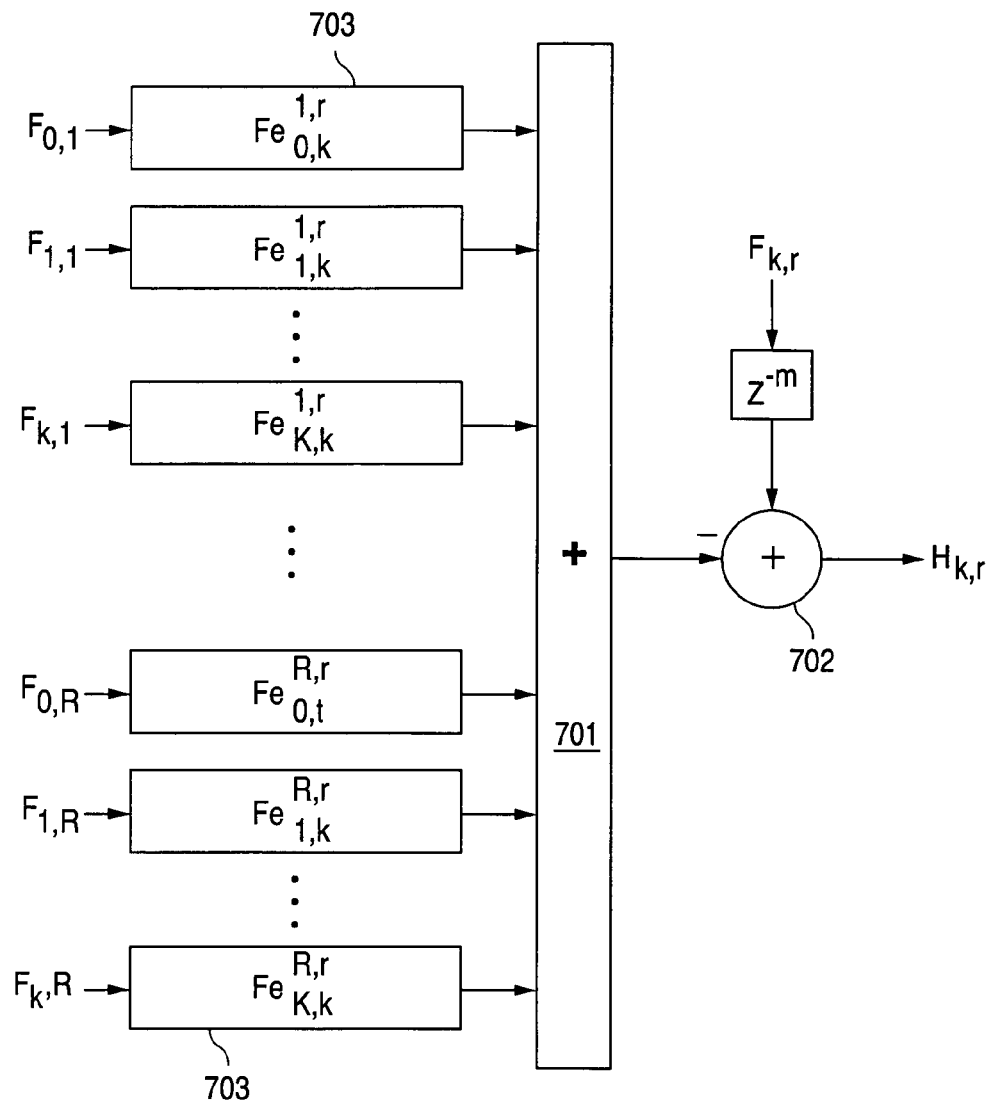
FIG. 7 shows a block diagram for a portion of an embodiment of a far-end cross talk (FEXT) interference filter according to the present invention.

Again, the transfer functions $Fe_{k,l}^{i,r}$, where $Fe_{k,l}^{i,r}=(Fe_{k,l}^{I,i,r}, Fe_{k,l}^{Q,i,r})$, is the transfer function describing the interference cancellation to the Ith channel of the rth receiver for signals from the kth channel of the ith receiver. FIG. 7 shows, in block diagram form, a portion of FEXT filter 251. The portion of FEXT filter 251 shown in FIG. 7 is the interference correction for the signal $F_{k,r}$ for signals received at receivers 0 through R. Since no correction is made for signals received at receiver 272-$r$, the transfer function $Fe_{k,l}^{r,r}$ is understood to be 0 and therefore there are no blocks in FIG. 7 for FEXT interference correction from receiver 272-$r$. As shown in FIG. 7, and mathematically depicted in Equation 8, a correction is made to each of signals $F_{0,1}$ through $F_{K,R}$ in transfer function blocks 703 and the results are summed in summer 701. The resulting total correction is subtracted from $F_{k,r}$, which is delayed in delay block 704, in summer 702 to form the value $H_{k,r}$. This correction is calculated for each of signals $F_{0,1}$ through $F_{K,R}$ in transceiver 255-$p$.

In embodiments such as that shown in FIG. 7, corrections into and from the baseband is included in FEXT filter 251. If the baseband is included in the filter calculations, equation 8 can be modified to include transfer functions $Fe_{k,0}^{i,r}$ and $Fe_{0,k}^{i,r}$, input signals $F_{0,r}$, and output signals $H_{0,r}$; otherwise, all of $Fe_{k,0}^{i,r}$ and $Fe_{0,r}^{i,r}$ are zero.

The transfer function $Fe_{k,l}^{i,r}$ can have any number of taps and, in general, can be given by $$Fe_{k,l}^{I,i,r}=\beta_{k,l}^{0,I,i,r}+\beta_{k,l}^{1,I,i,r}Z^{-1}+\beta_{k,l}^{2,I,i,r}Z^{-2}+\ldots+\beta_{k,l}^{W,I,i,r}Z_{-W};$$

$$Fe_{k,l}^{Q,i,r}=\beta_{k,l}^{0,Q,i,r}+\beta_{k,l}^{1,Q,i,r}Z^{-1}+\beta_{k,l}^{2,Q,i,r}Z^{-2}+\ldots+\beta_{k,l}^{W,Q,i,r}Z^{-W}. \tag{9}$$

The coefficients $\beta_{k,l}^{w,I\text{ or }Q,i,r}$ can be adaptively chosen according to $$\beta_{k,j}^{w,x,I,i,r}(v+1)=\beta_{k,j}^{w,x,I,i,r}(v)+\alpha(e_{l,r}^I(v)F_{k,i}^I(v-w))$$

$$\beta_{k,j}^{w,y,I,i,r}(v+1)=\beta_{k,j}^{w,y,I,i,r}(v)+\alpha(e_{l,r}^I(v)F_{k,i}^Q(v-w))$$

$$\beta_{k,j}^{w,x,Q,i,r}(v+1)=\beta_{k,j}^{w,x,Q,i,r}(v)+\alpha(e_{l,r}^Q(v)F_{k,i}^Q(v-w))$$

$$\beta_{k,j}^{w,x,Q,i,r}(v+1)=\beta_{k,j}^{w,x,Q,i,r}(v)+\alpha(e_{l,r}^Q(v)F_{k,i}^I(v-w)) \tag{10}$$

where $\beta_{k,l}^{w,I,i,r}=\beta_{k,l}^{w,x,I,i,r}+i\beta_{k,l}^{w,y,I,i,r}$ and $\beta_{k,l}^{w,Q,i,r}=\beta_{k,l}^{w,x,Q,i,r}+i\beta_{k,l}^{w,y,Q,i,r}$. The parameter $\alpha$ controls the rate at which Equation 10 converges on values for the coefficients $\beta_{k,l}^{w,I\text{ or }Q,i,r}$ and the stability of those values. In principle, $\alpha$ can be different for each of the adaptive equations shown as Equation 10. The parameters $e_{l,r}^I$ and $e_{l,r}^Q$ is the error between decided on symbols and input signals at slicer 516-1 of receiver 272-$r$.

In some embodiments of the invention, cross channel interference filter 570 and FEXT filter 251 can be combined into a single filter. As seen in Equations 6 and 8, Equation 8 can be easily modified to include the cross channel contributions described in Equation 6. The resulting combinations would combine the adaptively chosen transfer functions into a single transfer functions with adaptively chosen parameters, the new transfer function being of the form of $Fe_{k,I}^{i,r}$ as described with Equation 8 above for FEXT filter 251 alone, except that with the additional contributions from cross-channel interference as described with Equation 6 above the $Fe_{k,k}^{r,r}$ is not necessarily 0, only $Fe_{k,k}^{r,r}$ is still understood to be 0. The adaptively chosen parameters would include contributions for corrections for cross-channel interference and FEXT interference, but the resulting implementation would likely be smaller than with separate cross-channel interference filter 570 and FEXT filter 251 as is shown in FIG. 5. The embodiment shown in FIG. 5 separates the two filters only in order to simplify discussions of the two different contributions to the signal interference corrected by filters according to the present invention in receiver 272-r.

As shown in FIG. 5, the output signals from FEXT interference filter in each channel, $H_0$ and $H_1$ through $H_K$ are input to NEXT/Echo filters 250-0 through 250-K, respectively. For convenience in notation, the designation indicating receiver and the time index v have been dropped and it is understood that receiver 272-r and time period v are indicated. NEXT/Echo filters 250-0 through 250-K are further discussed below with reference to FIG. 6. NEXT/Echo filters 250-0 through 250-K receive signals from transmitters 270-1 through 270-T of transmitter portion 210-p of transceiver 255-p and removes the contribution of signals from transmitters 270-1 through 270-T from the values $H_0$ through $H_K$ in each of receivers 272-1 through 272-R that are due to near-end cross talk between transmitters 270-1 through 270-T and receivers 272-1 through 272-R.

Figure 6:
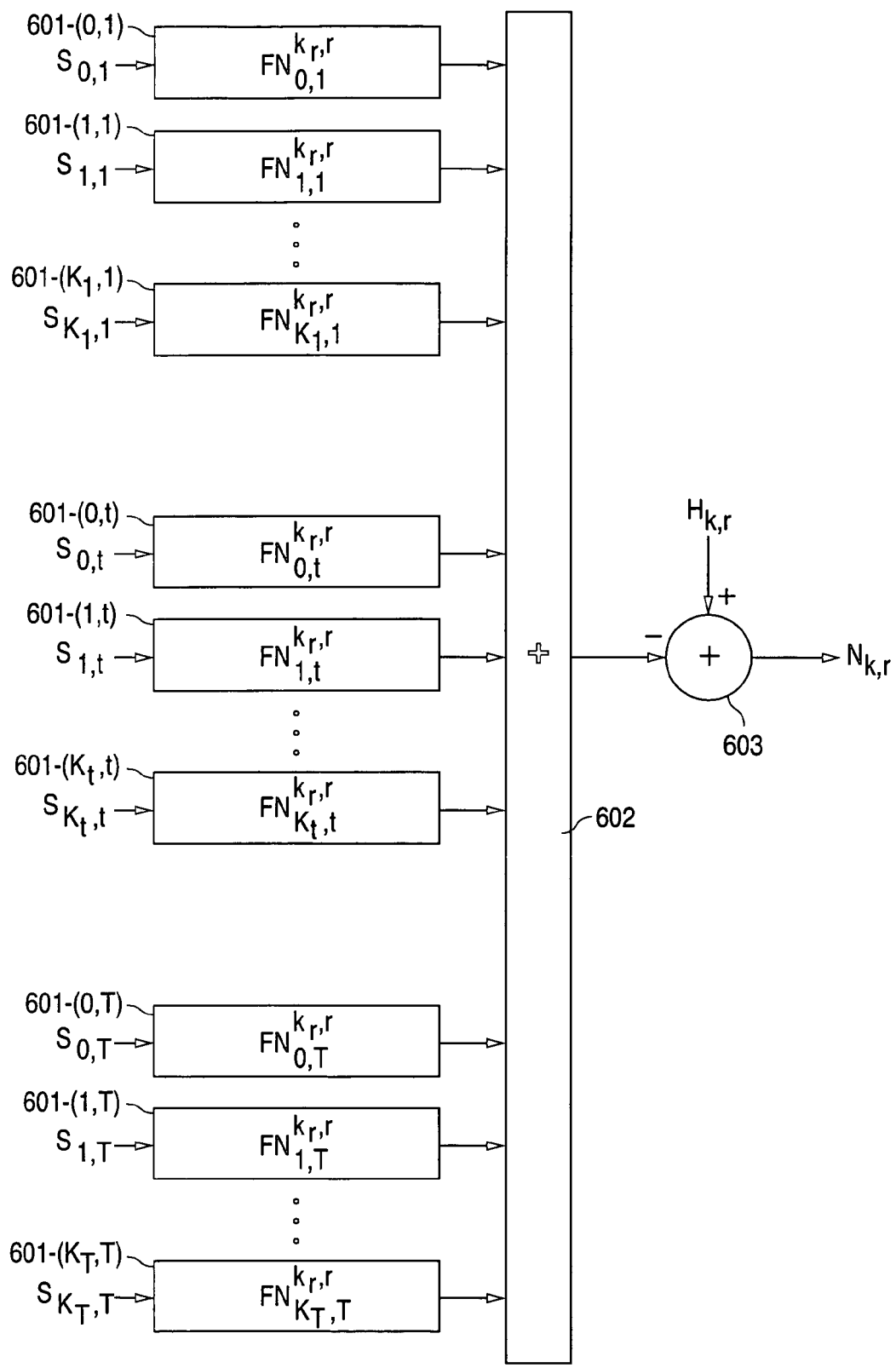
FIG. 6 shows a block diagram of a portion of an embodiment of a near-end cross talk (NEXT) interference filter according to the present invention.

FIG. 6 shows a block diagram of an embodiment of NEXT/Echo filter 250-k,r, which is a part of NEXT filter 250 shown in FIG. 2B. In particular, NEXT/Echo filter 250-k,r is an arbitrary one of NEXT/Echo filters 250-0 through 250-K on receiver 272-r, as shown in FIG. 5, each of which is a part of NEXT/Echo filter 250 shown in FIG. 2B. NEXT/Echo filter 250-k,r receives signals from each of transmitters 270-1 through 270-T of transmitter portion 210-p of transceiver 255-p. As shown in FIG. 6, signals $S_{0,1}$ through $S_{K_T,T}$ are received into transfer function blocks 601-(0,1) through 601-($K_T$,T), respectively, where $K_t$ indicates the number of channels in transmitter 270-t. Signal $S_{0,1}$ through $S_{0,T}$ are baseband transmitted signals from base-band modulators 217 from each of transmitters 270-1 through 270-T. As shown in FIG. 4A, signal $S_{0,t}$ may be the output signal from symbol mapper 456 of transmitter 270-t.

Signals $S_{1,t}$ through $S_{K_t,t}$ can be the complex output signals from up-converting modulators 212-1 through 212-$K_t$ of transmitter 270-t, respectively. The signal $S_{k,t}$, for example, can be the complex output signal from symbol mapper 403 of up-converting modulator 212-k (see FIG. 4B) of transmitter 270-t (see FIG. 2A). Therefore, $S_{k,t} = I_k^t + iQ_k^t$, where k=1 to $K_t$ and t indicates transmitter 270-t of transmitter portion 210-p of transceiver 255-p.

Each of transfer functions $FN_{0,k}^{1,r}$ through $FN_{K_T,k}^{T,r}$ in blocks 601-(0,1) through 601-($K_T$,T) of NEXT/Echo filter 250-k determines the amount of signal $S_{0,1}$ through $S_{K_T,T}$, respectively, that should be removed from the signal $H_k$ in receiver 272-r (see FIG. 5) to correct for near-end cross talk and Echo if necessary. Function $FN_{k_t,k_r}^{t,r}$, where $k_t$ indexes the $k_t$th channel, transmitted by up-converting modulator 212-$k_t$ in transmitter 270-t, and runs between 1 and $K_t$; and $k_r$ indexes the $k_r$th channel received in down-converting demodulator 222-$k_r$ in receiver 272-r and runs between 1 and $K_r$, represents an arbitrary one of the transfer functions of function blocks 601-(0,1) through 601-($K_T$,T). The function $FN_{k_t,k_r}^{t,r}$, where $FN_{k_t,k_r}^{t,r}$ represents the combination ($FN_{k_t,k_r}^{I,t,r}, FN_{k_t,k_r}^{Q,t,r}$), can be expressed as $$FN_{k_t,k_r}^{I,t,r} = \delta_{k_t,k_r}^{0,I,t,r} + \delta_{k_t,k_r}^{1,I,t,r} Z^{-1} + \ldots + \delta_{k_t,k_r}^{w,I,t,r} Z^{-w} + \ldots + \delta_{k_t,k_r}^{W,I,t,r} Z^{-w}$$

$$FN_{k_t,k_r}^{Q,t,r} = \delta_{k_t,k_r}^{0,Q,t,r} + \delta_{k_t,k_r}^{1,Q,t,r} Z^{-1} + \ldots + \delta_{k_t,k_r}^{w,Q,t,r} Z^{-w} + \ldots + \delta_{k_t,k_r}^{W,Q,t,r} Z^{-w}, \quad (11)$$

where $\delta_{k_t,k_r}^{w,I,t,r} = \delta_{k_t,k_r}^{w,x,I,t,r} + i\delta_{k_t,k_r}^{w,y,I,t,r}$ and $\delta_{k_t,k_r}^{w,x,Q,t,r} + i\delta_{k_t,k_r}^{w,y,Q,t,r}$ can be complex coefficients and $Z^{-1}$ represents a one cycle delay. The value M is an integer representing the number of taps in each function and can be different for each transfer function represented. For Echo cancellation, the number of delays may be increased to accommodate travel time of signals between complementary transceivers. Further, for NEXT/Echo filter 250-0, corresponding to the NEXT filter in base-band demodulator 223, all the output signals for all functions $FN_{0,0}^{1,r}$ through $FN_{K_T,0}^{T,r}$ may have real outputs.

Therefore, the output signals from NEXT/Echo interference filters 250-1 through 250-$K_r$ of receiver 252-r can be represented as $$\begin{bmatrix} Ne_{1,r}^I \\ Ne_{2,r}^I \\ \vdots \\ Ne_{k_r,r}^I \\ \vdots \\ Ne_{K_r,r}^I \end{bmatrix} = \begin{pmatrix} Z^{-D_r} & 0 & \ldots & 0 & \ldots & 0 \\ 0 & Z^{-D_r} & \ldots & 0 & \ldots & 0 \\ \vdots & \vdots & \ddots & \vdots & \ldots & \vdots \\ 0 & 0 & \ldots & Z^{-D_r} & \ldots & 0 \\ \vdots & \vdots & \ldots & \vdots & \ddots & \vdots \\ 0 & 0 & \ldots & 0 & \ldots & Z^{-D_r} \end{pmatrix} \begin{bmatrix} H_{1,r}^I \\ H_{2,r}^I \\ \vdots \\ H_{k_r,r}^I \\ \vdots \\ H_{K_r,r}^I \end{bmatrix} - \quad (12)$$

$$\mathrm{Re}\begin{bmatrix} \begin{pmatrix} FN_{1,1}^{1,r} & FN_{2,1}^{1,r} & \ldots & FN_{k_t,1}^{t,r} & \ldots & FN_{K_t,1}^{T,r} \\ FN_{1,2}^{1,r} & FN_{2,2}^{1,r} & \ldots & FN_{k_t,2}^{t,r} & \ldots & FN_{K_t,2}^{T,r} \\ \vdots & \vdots & \ddots & \vdots & \ldots & \vdots \\ FN_{1,k_r}^{1,r} & FN_{2,k_r}^{1,r} & \ldots & FN_{k_t,k_r}^{t,r} & \ldots & FN_{K_t,k_r}^{T,r} \\ \vdots & \vdots & \ldots & \vdots & \ddots & \vdots \\ FN_{1,K_r}^{1,r} & FN_{2,K_r}^{1,r} & \ldots & FN_{k_t,K_r}^{t,r} & \ldots & FN_{K_t,K_r}^{T,r} \end{pmatrix} \begin{bmatrix} S_{1,1} \\ S_{2,1} \\ \vdots \\ S_{k_t,t} \\ \vdots \\ S_{K_T,T} \end{bmatrix} \end{bmatrix},$$

and $$\begin{bmatrix} Ne_{1,r}^Q \\ Ne_{2,r}^Q \\ \vdots \\ Ne_{k_r,r}^Q \\ \vdots \\ Ne_{K_r,r}^Q \end{bmatrix} = \begin{pmatrix} Z^{-D_r} & 0 & \ldots & 0 & \ldots & 0 \\ 0 & Z^{-D_r} & \ldots & 0 & \ldots & 0 \\ \vdots & \vdots & \ddots & \vdots & \ldots & \vdots \\ 0 & 0 & \ldots & Z^{-D_r} & \ldots & 0 \\ \vdots & \vdots & \ldots & \vdots & \ddots & \vdots \\ 0 & 0 & \ldots & 0 & \ldots & Z^{-D_r} \end{pmatrix} \begin{bmatrix} H_{1,r}^Q \\ H_{2,r}^Q \\ \vdots \\ H_{k_r,r}^Q \\ \vdots \\ H_{K_r,r}^Q \end{bmatrix} -$$

$$\mathrm{Im}\begin{bmatrix} \begin{pmatrix} FN_{1,1}^{1,r} & FN_{2,1}^{1,r} & \ldots & FN_{k_t,1}^{t,r} & \ldots & FN_{K_t,1}^{T,r} \\ FN_{1,2}^{1,r} & FN_{2,2}^{1,r} & \ldots & FN_{k_t,2}^{t,r} & \ldots & FN_{K_t,2}^{T,r} \\ \vdots & \vdots & \ddots & \vdots & \ldots & \vdots \\ FN_{1,k_r}^{1,r} & FN_{2,k_r}^{1,r} & \ldots & FN_{k_t,k_r}^{t,r} & \ldots & FN_{K_t,k_r}^{T,r} \\ \vdots & \vdots & \ldots & \vdots & \ddots & \vdots \\ FN_{1,K_r}^{1,r} & FN_{2,K_r}^{1,r} & \ldots & FN_{k_t,K_r}^{t,r} & \ldots & FN_{K_t,K_r}^{T,r} \end{pmatrix} \begin{bmatrix} S_{1,1} \\ S_{2,1} \\ \vdots \\ S_{k_t,t} \\ \vdots \\ S_{K_T,T} \end{bmatrix} \end{bmatrix}.$$

In some embodiments of the invention, the coefficients of Equation 12 can be fixed. In some embodiments, the coefficients of Equation 12 can be adaptively chosen. In some embodiments, the coefficients can be adaptively chosen as follows:

$$\delta_{k_t k_r}^{w,x,I,t,r}(v+1)=\beta_{k_t k_r}^{w,x,I,t,r}(v)+\alpha(e_{k_r,r}^I(v)S_{k_t,t}^I(v-w))$$

$$\delta_{k_t k_r}^{w,y,I,t,r}(v+1)=\beta_{k_t k_r}^{w,y,I,t,r}(v)+\alpha(e_{k_r,r}^I(v)S_{k_t,t}^Q(v-w))$$

$$\delta_{k_t k_r}^{w,x,Q,t,r}(v+1)=\beta_{k_t k_r}^{w,x,Q,t,r}(v)+\alpha(e_{k_r,r}^Q(v)S_{k_t,t}^Q(v-w))$$

$$\delta_{k_t k_r}^{w,y,Q,t,r}(v+1)=\beta_{k_t k_r}^{w,y,Q,t,r}(v)+\alpha(e_{k_r,r}^Q(v)S_{k_t,t}^I(v-w)) \quad (13)$$

The coefficient α, which in some embodiments can be different for each of the parameters described by Equation 14, determines how fast equation 14 converges on stable parameters. Such parameters are typically chosen to be on the order of $10^{-3}$ to $10^{-5}$.

As indicated in Equations 11 and 12, the complex output signals from each of function blocks 601-(0,1) through 601-($K_T$,T) are summed in summer 602. The resulting sum is subtracted from the corresponding output signal from cross channel interference filter for channel 301-$k$ (i.e., base-band demodulator 223 if k=0 or down-converting demodulator 222-$k$ if k>0) in summer 603.

The embodiment shown physically in FIG. 6 includes the contributions from base-band modulator 217 of transmitters 270-1 through 270-T. However, some embodiments do not include the base-band contributions. Equation 12, for example, does not include that contribution, although one skilled in the art can easily modify Equation 13 to include the base-band contributions.

As shown in FIG. 5, the output signals from NEXT/Echo filter 250-$k$, $Ne_k^I$ and $Ne_k^Q$, are input to digital filter 563-$k$. Digital filter 563-$k$ can include further amplification, further offset, and quadrature correction. The amplification can be determined by automatic gain control such that, for example, the error signals generated by slicer 516-$k$ are minimized. The offset values can also be set to reduce or minimize the errors at slicer 516-$k$. Further, a quadrature correction can be applied to correct for the phase error between the in-phase and quadrature mixers at the transmitter. The output signals from digital filter 563-$k$, $G_k^1(v)$ and $G_k^Q(v)$, then, can be given by $$G_k^I(v)=g_k^{2-I}Ne_k^I(v)-\text{OFFSET}_2^I$$

$$G_k^Q(v)=g_k^{2-Q}Ne_k^Q(v)-g_k^{2-I}Ne_k^I(v)\hat{\theta}_k^{(2)}-\text{OFFSET}_2^Q, \quad (14)$$

where $g_k^{2(I)}$ and $g_k^{2(Q)}$ can be adaptively chosen gain values, $\hat{\theta}_k^{(2)}(v)$ can be the adaptively chosen quadrature correction, and $\text{OFFSET}_2^I$ and $\text{OFFSET}_2^Q$ can be the adaptively chosen offsets.

Adaptive parameters 517-$k$ receives signals from various sections of down-converting demodulator 222-$k$, including errors and decided on symbol values from slicer 516-$k$, and adjusts various parameters in down-converting demodulator 222-$k$ to optimize performance. Some parameters that can be adaptively chosen include gains, quadrature corrections, offsets, and equalizer coefficients. The parameters for cross-channel interference filter 570 can be chosen in cross-channel adaptive parameter block 581. In some embodiments, the parameters chosen by cross-channel adaptive parameter block 581 are chosen based on the decided on symbols ($\hat{a}_{k,r}^I$ and $\hat{a}_{k,r}^Q$) and errors ($e_{k,r}^I$ and $e_{k,r}^Q$) generated in slicers 516-1 through 516-K.

In some embodiments, frequency shift 564 generates a reference signal input to PLL 523 such that the frequency of component 201-$p$ with receiver system 220-$p$, $\hat{f}_1$ through $\hat{f}_K$, matches the frequency of the corresponding component 201-$q$ with transmitter system 210-$q$, $f_1$ through $f_K$, where component 201-$q$ is transmitting data to component 201-$p$. In embodiments where $f_1$ through $f_K$ correspond to frequencies $f_0$ through $Kf_0$, respectively, then frequency shift 564 shifts the frequency of a reference clock such that the frequency shift Δ is zero. The frequencies $\hat{f}_1$ through $\hat{f}_K$, then, are also frequencies $f_0$ through $Kf_0$. In some embodiments, frequency shift 564 can receive input from any or all loop filters in adaptive parameter blocks 577 and 517-1 through 517-K and adjusts the frequency shift such that $\hat{\theta}_K^{(1)}$ through $\hat{\theta}_k^{(K)}$ remain a constant, for example 0 or any other angle. In some embodiments, frequency shift 564 receives the output signals from any or all loop filters of adaptive parameter blocks 517-1 through 517-K and baseband adaptive parameter block 577. Frequency shift 564 can also change the frequency of the baseband receive clock to match that of the far end transceiver.

In Master/Slave environments, the Master can assume that its frequency shift can be 0 (for either just the mixers or for both the mixers and baseband clocks) and thus do no correction. While the slave will not only adjust its receive mixer and receive baseband clock to match the master with frequency shift 564, but it will also adjust its transmit clock frequencies (again for either just the mixers or for both the mixers and baseband clocks). By adjusting the transmit and receive mixer frequencies, the complexity of the filters utilized in transceiver 255-$p$ can be as described as opposed to more complicated systems. By adjusting the baseband frequencies as well, the Echo/NEXT filter also are as described in the disclosure as opposed to an immensely more complicated system.

As shown in FIG. 5, the output signals from digital filter 563-$k$, equalized samples $\{G_k^I(v), G_k^Q(v)\}$, are input to trellis decoder 514-$k$. Trellis decoding can be performed using the Viterbi algorithm, see, e.g., G. Ungerboeck., "Channel Coding with Multilevel/Phase Signals," IEEE Transactions on Information Theory, vol. IT-28, January 1982, pp. 55-67, G. Ungerboeck., "Trellis Coding Modulation with Redundant Signal Sets, Part I. Introduction," IEEE Communications Magazine, vol. 25, no. 2, February 1987, pp. 5-11, G. Ungerboeck., "Trellis Coding Modulation with Redundant Signal Sets, Part II. State of the Art," IEEE Communications Magazine, vol. 25, no. 2, February 1987, pp. 12-21, or G. C. CLARK, JR., AND J. B. CAIN, ERROR CORRECTION CODING FOR DIGITAL COMMUNICATIONS, PP. 253-264(Plenum Press, New York, 1981). Additionally, trellis decoder 514 converts from the QAM symbol set back to parallel bits. The output signal from trellis decoder 514, which now contains $n_k$ parallel bits, is input to descrambler 515-$k$. Descrambler 515-$k$ of receiver down-converting demodulator 222-$k$ operates to reverse the scrambling operation of scrambler 401 of up-converting modulator 212-$k$.

As is shown in FIG. 2D, the output signals from each of down-converting demodulators 222-1 through 222-K and base-band demodulator 223 are recombined into an $N_r^R$-bit parallel signal in bit parsing 221. Additionally, the RX clock signal is output from bit parsing 221. The designation $N_r^R$ indicates that there may be a different number of bits (with a different bit distribution between modulators) for each of transmitters 272-1 through 272-R, with $N_r^R$ indicating the number of bits received by transmitter 272-$r$.

Base-band demodulator 223 shown in FIG. 5 also receives the signal Z(t) from medium 110. Analog processing 571 in base-band demodulator 223 receives signal Z(t). Analog processing 571, for example, can include a low-pass filter in order to separate the base-band signal from those signals transported with carrier frequencies, such as those transmitted by up-converting modulators 212-1 through 212-K. Processor 571 can further include some analog correction of the signals, including anti-aliasing filters, base-line wander filters, or other filters.

The output signal from analog processing 571 is input to ADC 572, where it is digitized. ADC 572 can have any number of bits of resolution. At least a four bit ADC, for example, can be utilized in a 16-PAM system. ADC 572 can be clocked from a clock signal generated by receiver 120-$p$ in general, for example in PLL 523 as shown in FIG. 5. In some embodiments, adaptive parameter control 577 can generate a phase signal which can add a phase to the timing of ADC 572.

The output signal from ADC 572 can be input to a digital filter 573. Further filtering and shaping of the signal can occur in digital filter 573. Filter 573 can include, for example, a digital base-line wander filter, a digital automatic gain control circuit, or any other filter. The output signal from digital filter 573 can be input to cross-channel interference filter 570, which cancels any interference with the base-band signal processed by base-band demodulator 223 from the remaining channels 301-1 through 301-K. The output signal from cross-channel interference filter 570 for channel 301-0, $F_0$, is then input to FEXT filter 251. The output signal from FEXT filter 251, $H_0$, is then input to NEXT/Echo interference filter 250-0. NEXT/Echo interference filter 250-0 cancels the interference to channel 301-0 from transmission of data in transmitter 210-$p$ of transceiver 255-$k$ (see FIG. 2B). The output signal from NEXT/Echo interference filter 250-0 is input to filter 574. Filter 574 can include digital filtering and also performs an equalization.

Filter 574 equalizes the signal for intersymbol interference. Filter 574 can include a feed-forward section, a feed-back section, or a combination of feed-forward and feed-back sections. The output signal from filter 574 can then be input to data recovery 575. Data recovery 575 recovers the digital signal from the signals received from equalizer filter 574. In some embodiments, data recovery 575 is a PAM slicer. In some embodiments, data recovery 575 can also include an error correction decoder such as a trellis decoder, a Reed-Solomon decoder or other decoder. The output signal from data recovery 575 is then input to descrambler 576 so that the transmitted parallel bits are recovered.

Further examples and details of aspects of the above described multi-channel transceivers are described in U.S. application Ser. No. 10/310,255, "Multi-Channel Communications Transceiver", filed on Dec. 4, 2002, by Sreen A. Raghavan, Thulasinath G. Manickam, Peter J. Sallaway, and Gerard E. Tayler, U.S. application Ser. No. 10/167,158, "Multi-Channel Communications Transceiver", filed on Jun. 10, 2002, by Sreen A. Raghavan, Thulasinath G. Manickam, Peter J. Sallaway, and Gerard E. Tayler; U.S. application Ser. No. 10/071,771 to Sreen A. Raghavan, Thulasinath G. Manickam, Peter J. Sallaway, and Gerard E. Tayler; U.S. application Ser. No. 09/965,242 to Sreen Raghavan, Thulasinath G. Manickam, and Peter J. Sallaway, filed Sep. 26, 2001; and U.S. application Ser. No. 09/904,432, by Sreen Raghavan, filed on Jul. 11, 2001, each of which is assigned to the same entity as is the present application, each of which is herein incorporated by reference in its entirety.

In some embodiments of the invention, NEXT/echo filter 250 may be implemented ahead of cross-channel interference filter 570 and FEXT filter 251 in the data stream. By implementing Next/echo filter 250 first, the size of NEXT/Echo filter 250 may be smaller and/or have less taps. FEXT filter 251 and cross-channel interference filter 570 can move the NEXT/Echo interference from one channel to another, thus it is possible (or even likely) that a transform function $FN_{k_t,k_r}^{t,r}$ which may require few or no taps if cancellation of the NEXT and Echo interference was done first would need more taps after cross-channel interference filter 570 and FEXT filter 251 have been implemented. The opposite phenomena, i.e. implementation of FEXT filter 251 causing the FEXT interference to be transferred between channels, does not occur because NEXT/Echo filter 250 cancel utilizing transmit symbols instead of received signals.

One skilled in the art will recognize that various components of receiver 272-$r$ shown in FIG. 5 can be implemented in different orders than are shown. Further, although components are shown as circuit elements in this disclosure, it is understood that some if not all of the functions can be executed utilizing one or more digital processors executing software code.

The embodiments of the invention described above are exemplary only and are not intended to be limiting. One skilled in the art will recognize various modifications to the embodiments disclosed that are intended to be within the scope and spirit of the present disclosure. As such, the invention is limited only by the following claims.

We claim:

1. A transceiver, comprising:
   a receiver portion including at least one receiver to receive signals from a complementary transmitter through a single differential electrically conducting pair, the at least one receiver including a plurality of demodulators to receive the signals from a corresponding plurality of frequency separated channels, wherein the plurality of demodulators includes at least one down-converting demodulator, the down-converting demodulator comprising:
   an analog down converter coupled to receive an analog signal from the transmission medium and generate base-band signals corresponding to signals transmitted at a specific carrier frequency on the transmission medium;
   an analog-to-digital converter coupled to the down converter to provide a digitized base-band signal; and
   a decoder coupled to the analog-to-digital converter to provide data signals in response to the base-band signals; and
   an interference filter coupled to the receiver portion to substantially reduce interference in signals received by the receiver portion that result from transmission coupled to each of the plurality of corresponding frequency separated channels from transmitters other than the complementary transmitter.

2. The transceiver of claim 1, wherein the interference filter includes a far-end cross-talk filter.

3. The transceiver of claim 2, wherein the far-end cross-talk filter is combined with a cross-channel interference filter.

4. The transceiver of claim 2, wherein the far-end cross-talk filter receives input signals from each of the plurality of demodulators of each of the at least one receiver and removes interference from each of the signals in the receiver portion by subtracting a selected portion of each of the input signals from each of the signals in the receiver portion.

5. The transceiver of claim 4, wherein the far-end cross-talk filter further corrects for cross-channel interference by subtracting from each of the signals in the receiver portion a selected contribution from each of the other signals in the receiver portion.

6. The transceiver of claim 2, wherein parameters in the far-end cross-talk filter are adaptively chosen.

7. The transceiver of claim 1, wherein the transceiver further includes at least one transmitter and the interference filter includes a near-end cross talk and echo filter.

8. The transceiver of claim 7, wherein the near-end cross talk and echo filter subtracts from each of the signals received by the plurality of demodulators of each of the at least one receiver a selected portion of transmit signals transmitted by the at least one transmitter.

9. The transceiver of claim 8, wherein the at least one transmitter includes a plurality of modulators, each of the plurality of modulators transmitting into the corresponding plurality of frequency separated channels.

10. The transceiver of claim 8, wherein the selected portion is adaptively chosen.

11. The transceiver of claim 1, further including an analog filter coupled between the analog down converter and the analog-to-digital converter, the analog filter providing initial filtering and amplification to the base-band signals.

12. The transceiver of claim 11, wherein the analog filter includes an amplifier.

13. The transceiver of claim 1, wherein the analog filter includes a low pass filter.

14. The transceiver of claim 1, wherein the decoder includes a trellis decoder.

15. The transceiver of claim 14, wherein the trellis decoder decodes symbols form a QAM symbol set.

16. The transceiver of claim 1, wherein the plurality of demodulators includes a base-band demodulator, the base-band demodulator comprising:
   an analog processor coupled to receive the analog signal from the transmission medium;
   an analog-to-digital filter coupled to the analog processor, the analog-to-digital filter providing a digitized signal;
   an equalizing filter coupled to the analog-to-digital filter; and
   a data-recovery block coupled to receive signals from the equalizing filter.

17. The transceiver of claim 16, wherein the analog processor includes a low pass filter.

18. The transceiver of claim 16, wherein the equalizing filter includes an equalizer.

19. The transceiver of claim 16, wherein the data recovery block decodes data bits from a PAM symbol set.

20. The transceiver of claim 1, wherein the interference filter is coupled between the analog-to-digital converter and the decoder.

21. The transceiver of claim 20, further including a first digital filter coupled between the interference filter and the analog-to-digital converter.

22. The transceiver of claim 21, wherein the first digital filter includes phase and amplitude correction between in-phase and quadrature components of the digitized base-band signal output from the analog-to-digital filter.

23. The transceiver of claim 21, wherein the first digital filter includes an equalizer.

24. The transceiver of claim 21, further including a second digital filter coupled between the interference filter and the decoder.

25. The transceiver of claim 24, wherein the second digital filter includes phase and amplitude correction between in-phase and quadrature components of the base-band digital signal.

26. The transceiver of claim 24, wherein the second digital filter includes a digital offset.

27. The transceiver of claim 20, further including a cross-channel interference filter coupled between the digital filter and the interference filter.

28. The transceiver of claim 27, wherein the cross-channel interference is further coupled to a base-band demodulator to correct signals in the base-band demodulator from cross-channel interference.

29. The transceiver of claim 20, wherein the interference filter includes a far-end cross-talk filter.

30. The transceiver of claim 29, wherein the far-end cross-talk filter is coupled to receive input signals from each of the plurality of demodulators of each of the at least one receiver and corrects a signal related to the digitized base-band signals by subtraction a selected portion of each of the input signals from the signal related to the digitized base-band signals.

31. The transceiver of claim 30, wherein the selected portion of each of the input signals is adaptively chosen.

32. The transceiver of claim 30, wherein the far-end cross-talk filter includes cross-channel interference correction.

33. The transceiver of claim 30, wherein the transceiver further includes at least one transmitter, the at least one transmitter including a plurality of modulators coupled to transmit signals into a second plurality of frequency separated channels on the transmission medium.

34. The transceiver of claim 33, wherein the second plurality of frequency separated channels and the plurality of frequency separated channels are substantially identical.

35. The transceiver of claim 33, wherein the interference filter includes a near-end cross-talk filter.

36. The transceiver of claim 35, wherein a transmitter of the at least one transmitter and a receiver of the at least one receiver share a physical connection and the near-end cross-talk filter also corrects for echo interference.

37. The transceiver of claim 35, wherein the near-end cross-talk filter receives transmitted signals from each of the plurality of modulators from each of the at least one transmitter and subtracts a selected portion of each of the transmitted signals from a signal related to the digitized base-band signal.

38. A method of receiving data from a single differential electrically conducting pair, comprising:
   receiving signals into a plurality of demodulators from a corresponding plurality of frequency separated channels transmitted on the differential electrically conducting pair by a complementary transmitter;
   in at least one of the plurality of demodulators,
      analog down-converting the signal at the frequency of the frequency separated channel corresponding to the demodulator to a base-band signal,
      filtering out signals not at the base-band frequency,
      digitizing the base-band signal to form a digitized signal, and
      correcting the digitized signal to remove interference resulting from transmitters other than the complementary transmitter to form corrected signals; and
   recovering data transmitted by the complementary transmitter from signals related to the corrected signals for each of the plurality of demodulators.

39. The method of claim 38 wherein one of the plurality of demodulators receives signals transmitted on a base-band channel, the base-band channel being one of the plurality of frequency separated channels.

40. The method of claim 38, wherein correcting signals related to the digitized signals includes providing correction for far-end cross-talk interference.

41. The method of claim 40, wherein providing correction for far-end cross-talk interference includes subtracting a contribution of each signal in each of a second plurality of demodulators from the signals related to the digitized signal.

42. The method of claim 40, wherein providing correction for far-end cross-talk interference further includes correction for cross-channel interference, where a contribution from each of the plurality of demodulators is subtracted from the signals related to the digitized signal.

43. The method of claim 38, wherein correcting signals related to the digitized signals includes providing correction for near-end cross talk interference and echo interference.

44. The method of claim 43, where providing correction for near-end cross talk interference and echo interference includes subtracting a contribution from signals generated by at least one transmitter.

45. A transceiver system, comprising:
a transceiver comprising
a first transmitter including plurality of modulators, each of the plurality of modulators transmitting into one of a first plurality of frequency separated channels on a transmission medium, and
a first receiver including a plurality of demodulators, each of the plurality of demodulators receiving signals from one of a second plurality of frequency separated channels on the transmission medium; and
a complementary transceiver, the complementary transceiver including
a complementary first receiver coupled to receive signals corresponding to signals transmitted into one of the first plurality of frequency separated channels on the transmission medium by the first transmitter, and
a complementary first transmitter coupled to transmit signals into the second plurality of frequency separated channels on the transmission medium to be received by the first receiver; and
wherein the transceiver includes an interference filter coupled to the first receiver, the interference filter removing interference that result from transmitters other than the complementary first transmitter from signals in the first receiver, and wherein the first plurality of frequency separated channels and the second plurality of frequency separated channels are each transmitted on a single differential conducting pair.

46. The transceiver system of claim 45, wherein the interference filter includes a far-end cross-talk filter coupled to receive signals from at least one other transmitter in the transceiver and to correct signals in the first receiver.

47. The transceiver system of claim 45, wherein the interference filter includes a near-end cross-talk and echo filter coupled to receive signals from the first transmitter and correct signals in the first receiver.

48. The transceiver system of claim 47, wherein the near-end cross-talk and echo filter is further coupled to receive signals from at least one other transmitter in the transceiver.

49. The transceiver system of claim 45, wherein the transmission medium includes a first twisted copper pair coupling the first transmitter with the complementary first receiver and a second twisted copper pair coupling the first receiver with the complementary first transmitter.

50. The transceiver system of claim 49,
wherein the transceiver further includes a second transmitter and a second receiver, and the complementary transceiver further includes a complementary second receiver and a complementary second transmitter, and
wherein the transmission medium includes a third copper pair coupling the second transmitter with the complementary second receiver and a fourth copper pair coupling the second receiver and the complementary second transmitter.

51. The transceiver system of claim 50, wherein the first plurality of frequency separated channels includes four channels at frequencies $f_0$, $2f_0$, $3f_0$ and $4f_0$, where $f_0$ is about 312.5 MHz,
the second plurality of frequency separated channels is substantially the same as the first set of frequency separated channels,
each of the plurality of modulators transmits QAM 128 symbols with 6/7 trellis encoding at a baud rate of 208.333 Msymbols/sec, and
each of the plurality of demodulators receives QAM 128 symbols with 6/7 trellis encoding at a baud rate of 208.333 Msymbols/sec.

52. The transceiver system of claim 45, wherein the transmission medium includes a first copper pair, the first transmitter and the complementary first receiver are coupled through the first copper pair and the first receiver and the complementary first transmitter are also coupled through the first copper pair.

53. The transceiver system of claim 52,
wherein the transceiver includes a second transmitter, a third transmitter and a fourth transmitter, a second receiver, a third receiver and a fourth receiver and the complementary transceiver includes a complementary second transmitter, a complementary third transmitter, a complementary fourth transmitter, a complementary second receiver, a complementary third receiver, and a complementary fourth receiver, and
wherein the transmission medium further comprises: a second copper pair coupling the second transmitter, the second receiver, the complementary second transmitter and the complementary second receiver; a third copper pair coupling the third transmitter, the third receiver, the complementary third transmitter and the complementary third receiver; and a fourth copper pair coupling the fourth transmitter, the fourth receiver, the complementary fourth transmitter and the complementary fourth receiver.

54. The transceiver system of claim 53, wherein
the first plurality of frequency separated channels is at f.sub.0 and 2f.sub.0, where f.sub.0 is about 312.5 MHz,
the second plurality of frequency separated channels is substantially the same as the first plurality of frequency separated channels,
each of the plurality of modulators transmits a QAM 128 symbol set with 6/7 trellis encoding at a baud rate of about 208.333 Msymbols/sec, and
each of the plurality of demodulators receives QAM 128 symbols with 6/7 trellis encoding at a baud rate of 208.333 Msymbols/sec.

55. The transceiver system of claim 54, wherein the first plurality of frequency separated channels is at frequencies f.sub.0 and 3f.sub.0 and the second plurality of frequency separated channels is at frequencies 2f.sub.0 and 4f.sub.0.

56. The transceiver system of claim 54, wherein the interference filter includes a far-end cross-talk filter coupled to the receive signals from each of the first receiver, the second receiver, the third receiver and the fourth receiver and to correct signals in each of the first receiver, the second receiver, the third receiver and the fourth receiver.

57. The transceiver system of claim 54, wherein the interference filter includes a near-end cross-talk and echo filter coupled to receive signals from the first transmitter, the second transmitter, the third transmitter and the fourth transmitter and to correct signals in the first receiver, the second receiver, the third receiver and the fourth receiver.

58. The transceiver system of claim 45, wherein the transceiver includes a master phase-locked loop to provide timing signals and the complementary transceiver includes a frequency shift and a phase-locked loop to recover the timing signal of the transceiver.

59. The transceiver system of claim 45, wherein the complementary transceiver includes a master phase-locked loop to provide timing signals and the transceiver includes a frequency shift and a phase-locked loop to recover the timing signal of the transceiver.

60. A communication device, comprising:
- a receiver to receive signals on a set of frequency separated channels from a complementary transmitter, the set of frequency separated channels being transmitted on a single conducting twisted copper pair, the receiver including a plurality of demodulators, each of the plurality of demodulators analog down converting one of the frequency separated channels to a base-band signal and digitizing the base-band signal; and
- a filtering unit to correct for interference in the signals from a transmitter other than the complementary transmitter.

61. A transceiver, comprising
- means for receiving signals from a plurality of frequency separated channels transmitted from a complementary transmitter through a single differential conducting pair, the means for receiving including a plurality of demodulators, each of the plurality of demodulators analog down-converting one of the plurality of frequency separated channels to a base-band signal and digitizing the base-band signal; and
- means for correcting for interference from the effects of transmitters other than the complementary transmitter transmitting on the single differential conducting pair.

62. The transceiver of claim 61, further including means for transmitting signals into a second plurality of frequency separated channels on a second differential conducting pair.

63. The transceiver of claim 61, wherein the means for correcting for interference includes means for correcting for far-end cross-talk interference.

64. The transceiver of claim 62, wherein the means for correcting for interference includes means for corrected for near-end cross-talk and echo interference.

65. The transceiver of claim 61, further including means for performing timing recovery.

* * * * *